United States Patent
Bilgin et al.

(10) Patent No.: US 12,463,954 B2
(45) Date of Patent: Nov. 4, 2025

(54) AUTHENTICATION OF AN ENTITY

(71) Applicant: Telefonaktiebolaget LM Ericsson (publ), Stockholm (SE)

(72) Inventors: Zeki Bilgin, Istanbul (TR); Emrah Tomur, Izmir (TR); Elif Ustundag Soykan, Istanbul (TR); Mehmet Akif Ersoy, Istanbul (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 559 days.

(21) Appl. No.: 17/781,085

(22) PCT Filed: Feb. 25, 2020

(86) PCT No.: PCT/EP2020/054908
§ 371 (c)(1),
(2) Date: May 31, 2022

(87) PCT Pub. No.: WO2021/110288
PCT Pub. Date: Jun. 10, 2021

(65) Prior Publication Data
US 2023/0006993 A1 Jan. 5, 2023

(30) Foreign Application Priority Data
Dec. 4, 2019 (EP) .................................. 19404006

(51) Int. Cl.
*H04L 9/40* (2022.01)
(52) U.S. Cl.
CPC ............................. *H04L 63/0823* (2013.01)

(58) Field of Classification Search
CPC .................................................. H04L 63/0823
See application file for complete search history.

(56) References Cited

U.S. PATENT DOCUMENTS

| | | | |
|---|---|---|---|
| 11,030,595 B1* | 6/2021 | David | G06Q 20/145 |
| 11,237,030 B2* | 2/2022 | Shao | G01D 18/00 |
| 2014/0223526 A1 | 8/2014 | Lu et al. | |
| 2016/0316365 A1 | 10/2016 | Buhler et al. | |
| 2019/0297395 A1* | 9/2019 | Huang | H04N 7/183 |
| 2023/0244202 A1* | 8/2023 | Bölderl-Ermel et al. | H04L 9/50 700/79 |

FOREIGN PATENT DOCUMENTS

WO  2019112923 A1  6/2019

* cited by examiner

*Primary Examiner* — Phy Anh T Vu
(74) *Attorney, Agent, or Firm* — Murphy, Bilak & Homiller, PLLC

(57) ABSTRACT

There is provided a method performed by a first entity of a network. Contextual information for the first entity and a timestamp for the contextual information is acquired (102). An authentication token is generated (104) using the acquired contextual information. Transmission of an authentication request message is initiated (106) towards a second entity of the network requesting authentication of the first entity with the second entity. The authentication request message comprises the generated authentication token and the timestamp for use in the authentication. An authentication response message indicative of whether authentication of the first entity with the second entity is successful or unsuccessful received (108).

23 Claims, 13 Drawing Sheets

| | |
|---|---|
| value | Other Context-Based Data |
| value | Random Number |
| value | Location Related Data |
| value | Network Related Data |
| value | Environmental Data |
| value | Electricity Consumption Data — Other |
| value | Electricity Consumption Data — Phase |
| value | Electricity Consumption Data — Frequency (Hz) |
| value | Electricity Consumption Data — Current (mA) |
| value | Electricity Consumption Data — Power Factor |
| value | Electricity Consumption Data — Reactive Power (mVA) |
| value | Electricity Consumption Data — Active Power (mW) |
| value | Electricity Consumption Data — Power (mW) |
| value | Timestamp |

Figure 7

AUTHENTICATION OF AN ENTITY

TECHNICAL FIELD

The disclosure relates to methods for authenticating an entity. The disclosure also relates to entities configured to operate in accordance with those methods.

BACKGROUND

Many networks employ techniques to authenticate entities that communicate via the network. Examples of such networks include internet of things (IoT) networks and machine to machine (M2M) networks. Both IoT and M2M networks can operate without manual assistance from humans.

IoT networks are those that enable devices, which are embedded with sensors, software and electronics, to communicate with each other (e.g. to exchange data and/or perform actions). IoT networks use an Internet platform to enable this communication. The devices can be uniquely identifiable through this Internet platform. M2M networks are those that enable machines to communicate with each other directly (e.g. to exchange information and/or perform actions). M2M networks support point-to-point communication and do not necessarily rely on an Internet connection. Instead, the machines communicate with each other using wired and/or wireless communication channels. M2M networks can enable remote monitoring of operations (e.g. industrial operations) and/or can be used to automate processes. There also exist networks that combine the communication capabilities of M2M networks and IoT networks. These networks can be useful for industrial applications, such as applications in production, logistics, and/or lifecycle management processes.

In existing M2M and/or IoT networks, entities (e.g. the devices or machines) are authenticated mostly using keys, such as pre-shared symmetric keys or public-private key pairs. However, this requires a trusted third party to generate and distribute the keys. Moreover, the keys are generated based on static credentials that are not updated or changed for different message exchanges, sessions or logins, which means that the keys themselves are static. The keys are thus vulnerable to certain threats. An example of such a threat is a replay attack. In this sort of attack, the static keys are sniffed and then maliciously re-used (replayed) by attackers in subsequent sessions or logins to gain access to resources, and/or previously transmitted data packets can be resent to trick a receiver into taking an action specified by a hacker. In another sort of attack, a static key is compromised and subsequent communications become insecure in terms of confidentiality, integrity and other security-related features of data exchange.

There exist techniques that use a trusted execution environment (TEE) with ephemeral keys, which partly address these issues. However, such a TEE is not always feasible and/or available, which is especially the case for constrained IoT devices. In addition, the management of keys is a complex process, which requires generating, exchanging, storing, and revoking mechanisms. As such, these existing techniques have some inherent difficulties, which cause an overhead to network. This can be particularly severe in large scale networks that have large numbers of devices or machines.

Some other existing techniques require a user generated password for authentication. However, since it is difficult for a human user to remember passwords, a user generally uses short and easy to remember passwords or tokens when authenticating themselves. This can increase the risk of security breaches. There is not such a problem for devices or machines, since devices or machines can use large and complex passwords in different formats. Thus, authentication mechanisms developed for devices or machines need different design considerations than authentication mechanisms developed for human user authentication.

Moreover, as M2M and IoT networks become more widespread and advance, new and additional security mechanisms are required. The security mechanisms required can depend on the criticality of the networks as each network has its own unique requirements and structure, such as the requirements of deploying constrained devices and/or low latency. Also, as network management and operations are becoming more autonomous, the security mechanisms in the networks usually need to work without human intervention as much as possible. Therefore, there is a need for authentication mechanisms that enable the management and generation of keys in a secure and autonomous way, especially for M2M and IoT networks.

SUMMARY

It is an object of the disclosure to obviate or eliminate at least some of the above-described disadvantages associated with existing techniques and provide an improved technique for authenticating an entity of a network.

Therefore, according to an aspect of the disclosure, there is provided a method performed by a first entity of a network. The method comprises acquiring contextual information for the first entity and a timestamp for the contextual information and generating an authentication token using the acquired contextual information. The method also comprises initiating transmission of an authentication request message towards a second entity of the network requesting authentication of the first entity with the second entity. The authentication request message comprises the generated authentication token and the timestamp for use in the authentication. The method also comprises receiving an authentication response message indicative of whether authentication of the first entity with the second entity is successful or unsuccessful.

There is thus provided an improved method for authenticating a first entity. In particular, the method involves generating and exchanging dynamic credentials (in the form of an authentication token) by use of contextual information for the first entity and a corresponding timestamp for that contextual information for authenticating the first entity with the second entity. As the credentials are dynamic, the method is resistant against replay attacks because the credentials can vary (or change) over time depending on the contextual information at that time. Moreover, the use of contextual information for the first entity in generating the credentials means that the generated credentials can contain longer and richer data types, which can be extended depending on threat level. This makes the method more resistant against brute-force attacks. Thus, the method provides improved security. The method also eliminates the need for user generated passwords by instead using contextual information for the first entity in the generation of the authentication token.

In some embodiments, the method may comprise generating the authentication token using the acquired contextual information and any one or more of the timestamp, a random number generated for the first entity and having the timestamp, identification information for the first entity, and identification information for the second entity. Where the timestamp is used in the generation of the authentication token, the freshness of the authentication token can be checked and tokens that are dated back to a certain predetermined period can be invalidated, which provides protection against replay attacks and forces the use of fresh enough tokens. The use of a random number generated for the timestamp can increase the strength of the unpredictability of the first authentication token. Where identification information for the entities is used in the generation of the authentication token, it can be ensured that a particular token is only for authentication processes between these identified entities, not for others.

In some embodiments, the network may be an internet of things (IoT) network. In this way, the method can be used to enhance security of a wide range of IoT applications in harmony with their dynamic and autonomous manner of operation.

In some embodiments, the contextual information for the first entity may comprise any one or more of utility consumption information for the first entity, environmental information for the first entity, location information for the first entity, neighbourhood information for the first entity, and network information for the first entity. As at least some of this contextual information is already transmitted within the network, the method can make an additional use of this data in the generation of the authentication token. This eliminates the need for creating and sending extra dynamic tokens. As such, energy efficiency can be provided. The method can be used in constrained devices without requiring heavy computations for security algorithms and protocols. Moreover, existing infrastructure can be used for the acquisition of contextual information for the first entity, which means that the method benefits from security measures already implemented in those infrastructures.

In some embodiments, transmission of the authentication request message towards the second entity may be initiated via an in-band communication channel between the first entity and the second entity. In this way, the method can be integrated with common network protocols used in in-band communication channels.

According to another aspect of the disclosure, there is provided a first entity comprising processing circuitry configured to operate in accordance with the method described earlier in respect of the first entity. In some embodiments, the first entity may comprise at least one memory for storing instructions which, when executed by the processing circuitry, cause the first entity to operate in accordance with the method described earlier in respect of the first entity. The first entity thus provides the advantages discussed earlier in respect of the method performed by the first entity.

According to another aspect of the disclosure, there is provided a method performed by a second entity of a network. The method comprises, in response to receiving an authentication request message from a first entity of the network requesting authentication of the first entity with the second entity, wherein the authentication request message comprises an authentication token and a timestamp for contextual information for the first entity used to generate the authentication token, initiating transmission of a verification request message towards a third entity requesting verification of the authentication request message. The verification request message comprises the authentication token and the timestamp for use in the verification. The method also comprises receiving a verification response message from the third entity indicative of whether verification of the authentication request message is successful and initiating transmission of an authentication response message towards the first entity. The authentication request message indicates that authentication of the first entity with the second entity is successful if verification of the authentication request message is successful or indicates that authentication of the first entity with the second entity is unsuccessful if verification of the authentication request message is unsuccessful.

There is thus provided an improved method for authenticating a first entity. In particular, the authentication token provides a dynamic credential as it is generated using contextual information for the first entity. As the credential is dynamic, the method is resistant against replay attacks because the credentials can vary (or change) over time depending on the contextual information at that time. Moreover, the use of contextual information for the first entity in generating the credentials means that the generated credentials can contain longer and richer data types, which can be extended depending on threat level. This makes the method more resistant against brute-force attacks. Thus, the method provides improved security. The method also eliminates the need for user generated passwords by instead using contextual information for the first entity in the generation of the authentication token.

According to another aspect of the disclosure, there is provided a second entity comprising processing circuitry configured to operate in accordance with the method described earlier in respect of the second entity. In some embodiments, the second entity may comprise at least one memory for storing instructions which, when executed by the processing circuitry, cause the second entity to operate in accordance with the method described earlier in respect of the second entity. The second entity thus provides the advantages discussed earlier in respect of the method performed by the second entity.

According to another aspect of the disclosure, there is provided a method performed by a third entity. The method comprises, in response to receiving a verification request message from a second entity of a network requesting verification of an authentication request message, wherein the verification request message comprises a first authentication token for a first entity and a timestamp for contextual information for the first entity used to generate the first authentication token, generating a second authentication token using contextual information stored in a database for the first entity of the network with the timestamp. The method also comprises checking whether the second authentication token is the same as the first authentication token or different to the first authentication token and initiating transmission of a verification response message towards the second entity. The verification response message indicates that verification of the authentication request message is successful if the second authentication token is the same as the first authentication token or indicates that verification of the authentication request message is unsuccessful if the second authentication token is different to the first authentication token.

There is thus provided an improved method for authenticating a first entity. In particular, the authentication token provides a dynamic credential as it is generated using contextual information for the first entity. As the credential is dynamic, the method is resistant against replay attacks because the credentials can vary (or change) over time depending on the contextual information at that time. Moreover, the use of contextual information for the first entity in generating the credentials means that the generated credentials can contain longer and richer data types, which can be extended depending on threat level. This makes the method more resistant against brute-force attacks. Thus, the method provides improved security. The method also eliminates the need for user generated passwords by instead using contextual information for the first entity in the generation of the authentication token.

In some embodiments, the network may be an internet of things (IoT) network. In this way, the method can be used to enhance security of a wide range of IoT applications in harmony with their dynamic and autonomous manner of operation.

In some embodiments, the method may comprise acquiring the contextual information for the first entity and the timestamp for the contextual information and controlling the database to store the acquired contextual information for the first entity with the timestamp. In this way, it becomes possible to use the stored contextual information for authentication purposes later.

In some embodiments, a communication channel via which the contextual information for the first entity and the timestamp for the contextual information is acquired may be an out-of-band communication channel. In this way, the security of the method can be further improved as usage of out-of-band authentication (OOBA) is enabled. For example, utilizing an extra communication channel, which is separate from the primary communication channel used by the first and second entities, makes it significantly more difficult for an attacker to intercept and subvert the authentication process, because it requires an attacker to compromise two different communications channels.

In some embodiments, the method may comprise generating the second authentication token using the contextual information stored in the database for the first entity with the timestamp and any one or more of the timestamp, a random number stored in the database for the first entity with the timestamp, identification information for the first entity, and identification information for the second entity. In this way, the second authentication token is obtained for the comparison with the first authentication token generated earlier based on the identical contextual information. In such a way, due to the timestamp used in the generation of the second authentication token, the freshness of the second authentication token can be checked and tokens that are dated back to a certain pre-determined period can be rejected, which provides protection against replay attacks and forces to the use of fresh enough tokens. The use of a random number generated for the timestamp can increase the strength of the unpredictability of the first authentication token and thus, by using the random number stored in the database for the first entity with the timestamp in the generation of the second token, it can be better ensured that the first authentication token is trusted when it is checked against the second authentication token. Also, by using the identification information of the entities in the generation of the second authentication token, it can be ensured that a particular token is only for authentication processes between these particular entities, not for others.

In some embodiments, the contextual information stored in the database for the first entity with the timestamp may comprise any one or more of utility consumption information for the first entity, environmental information for the first entity, location information for the first entity, neighbourhood information for the first entity, and network information for the first entity. As at least some of this contextual information is already transmitted within the network, the method can make an additional use of this data in the generation of the authentication token. This eliminates the need for creating and sending extra tokens. As such, energy efficiency can be provided. The method can be used in constrained devices without requiring heavy computations for security algorithms and protocols. Moreover, existing infrastructure can be used for the acquisition of contextual information for the first entity, which means that the method benefits from security measures already implemented in those infrastructures.

In some embodiments, transmission of the authentication request message towards the second entity may be initiated via an in-band communication channel between the first entity and the second entity. In this way, the method can be integrated with common network protocols used in in-band communication channels.

According to another aspect of the disclosure, there is provided a third entity comprising processing circuitry configured to operate in accordance with the method described earlier in respect of the third entity. In some embodiments, the third entity may comprise at least one memory for storing instructions which, when executed by the processing circuitry, cause the third entity to operate in accordance with the method described earlier in respect of the third entity. The third entity thus provides the advantages discussed earlier in respect of the method performed by the third entity.

According to another aspect of the disclosure, there is provided a network comprising any one or more of the first entity as described earlier, the second entity as described earlier, and the third entity as described earlier. The network thus provides the advantages discussed earlier in respect of the method performed by the first entity, second entity, and/or third entity.

According to another aspect of the disclosure, there is provided a computer program comprising instructions which, when executed by processing circuitry, cause the processing circuitry to perform the method described earlier in respect of the first entity, second entity, and/or third entity. The computer program thus provides the advantages discussed earlier in respect of the method performed by the first entity, second entity, and/or third entity.

According to another aspect of the disclosure, there is provided a computer program product, embodied on a non-transitory machine-readable medium, comprising instructions which are executable by processing circuitry to cause the processing circuitry to perform the method described earlier in respect of the first entity, second entity, and/or third entity. The computer program product thus provides the advantages discussed earlier in respect of the method performed by the first entity, second entity, and/or third entity.

Therefore, an advantageous technique for authenticating an entity is provided.

BRIEF DESCRIPTION OF THE DRAWINGS

For a better understanding of the technique, and to show how it may be put into effect, reference will now be made, by way of example, to the accompanying drawings, in which:

FIG. 7 is an example of contextual information according to an embodiment;

DETAILED DESCRIPTION

As mentioned earlier, an advantageous technique for authenticating an entity is described herein. The technique that is described herein is implemented by a first entity of a network, a second entity of the network, and a third entity of the network. In some embodiments, the network referred to herein may be an internet of things (IoT) network and/or a machine to machine (M2M) network.

Figure 1:
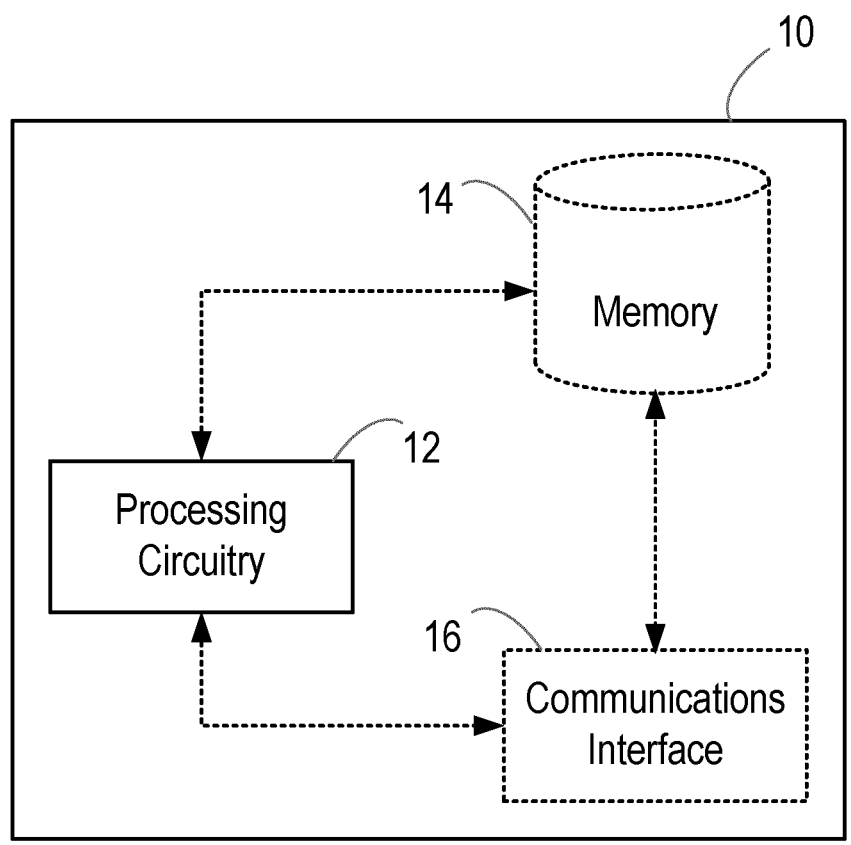
FIG. 1 is a block diagram illustrating a first entity according to an embodiment.

FIG. 1 illustrates a first entity 10 of a network in accordance with an embodiment. The first entity 10 is for authenticating the first entity 10 with a second entity. The first entity 10 can, for example, be a machine (e.g. a physical machine or a virtual machine) or a device.

As illustrated in FIG. 1, the first entity 10 comprises processing circuitry (or logic) 12. The processing circuitry 12 controls the operation of the first entity 10 and can implement the method described herein. The processing circuitry 12 can comprise one or more processors, processing units, multi-core processors or modules that are configured or programmed to control the first entity 10 in the manner described herein. In particular implementations, the processing circuitry 12 of the first entity 10 can comprise a plurality of software and/or hardware modules that are each configured to perform, or are for performing, individual or multiple steps of the method described herein.

Briefly, the processing circuitry 12 of the first entity 10 is configured to acquire contextual information for the first entity 10 and a timestamp for the contextual information, and generating a first authentication token using the acquired contextual information. The processing circuitry 12 of the first entity 10 is configured to initiate transmission of an authentication request message towards a second entity of the network requesting authentication of the first entity with the second entity. The authentication request message comprises the generated first authentication token and the timestamp for use in the authentication. The processing circuitry 12 of the first entity 10 is configured to receive an authentication response message indicative of whether authentication of the first entity with the second entity is successful or unsuccessful.

As illustrated in FIG. 1, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10. Alternatively or in addition, the memory 14 of the first entity 10 can be configured to store any messages, requests, responses, indications, information, data, notifications, signals, or similar, that are described herein. The processing circuitry 12 of the first entity 10 may be configured to control the memory 14 of the first entity 10 to store any messages, requests, responses, indications, information, data, notifications, signals, or similar, that are described herein.

In some embodiments, as illustrated in FIG. 1, the first entity 10 may optionally comprise a communications interface 16. The communications interface 16 of the first entity 10 can be connected to the processing circuitry 12 of the first entity 10 and/or the memory 14 of first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with the second entity, the third entity, and/or any other entity of the network. The communications interface 16 of the first entity 10 can be configured to transmit and/or receive any messages, requests, responses, indications, information, data, notifications, signals, or similar, that are described herein. In some embodiments, the processing circuitry 12 of the first entity 10 may be configured to control the communications interface 16 of the first entity 10 to transmit and/or receive any messages, requests, responses, indications, information, data, notifications, signals, or similar, that are described herein.

Although the first entity 10 is illustrated in FIG. 1 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 1 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 1 only shows the components required to illustrate an embodiment of the first entity 10 and, in practical implementations, the first entity 10 may comprise additional or alternative components to those shown.

Figure 2:
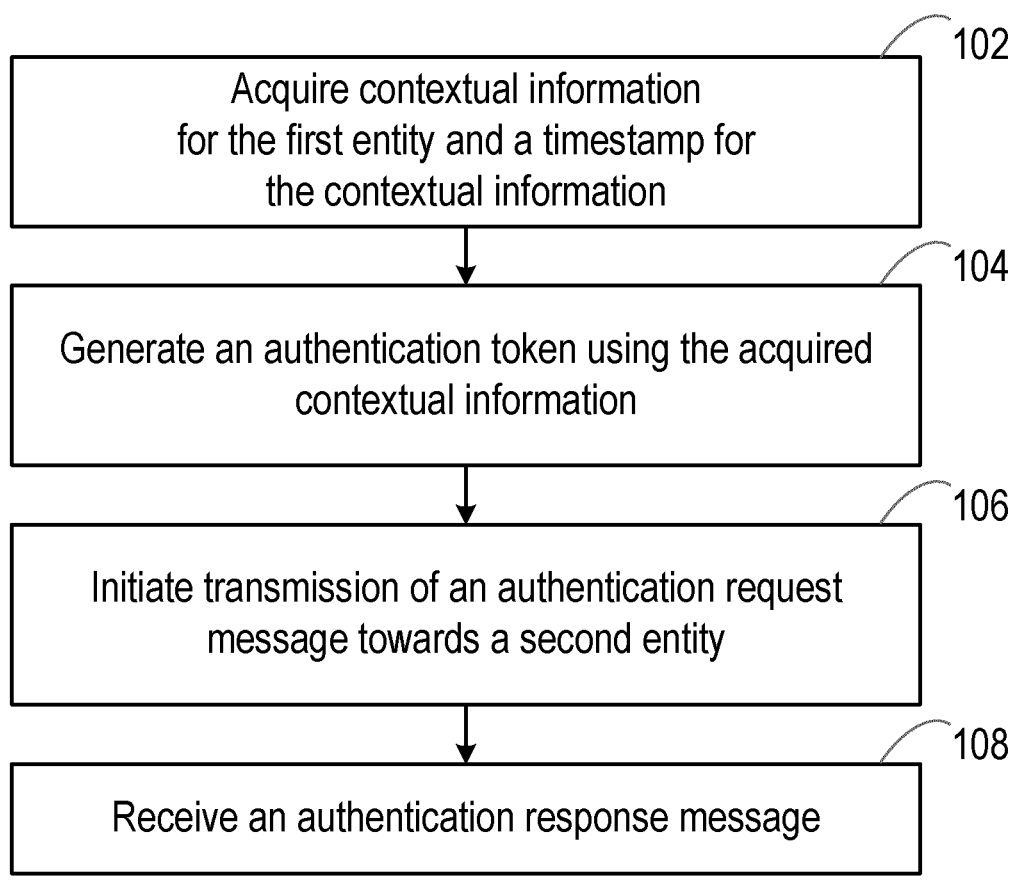
FIG. 2 is a block diagram illustrating a method performed by a first entity according to an embodiment.

FIG. 2 is a flowchart illustrating a method performed by a first entity 10 in accordance with an embodiment. The method is for authenticating the first entity 10 with a second entity. The first entity 10 described earlier with reference to FIG. 1 is configured to operate in accordance with the method of FIG. 2. The method can be performed by or under the control of the processing circuitry 12 of the first entity 10.

As illustrated at block 102 of FIG. 2, contextual information (e.g. one or more contextual parameters) for the first entity 10 and a timestamp for the contextual information is acquired. More specifically, the processing circuitry 12 of the first entity 10 acquires the contextual information and the timestamp. The contextual information for the first entity 10 can be any information related to or belonging to the first entity 10. The contextual information for the first entity 10 may be acquired instantaneously or in real time (or near real time). The method illustrated in FIG. 2 is thus context-aware.

In some embodiments, the contextual information for the first entity 10 of the network and the timestamp for the contextual information may be represented as a tuple.

The contextual information referred to herein is information that provides context to the first entity 10. For example, the contextual information referred to herein may be any information that can be used to characterize the state of the first entity 10 according to some embodiments. Generally, contextual information is dynamic. That is, contextual information can vary (or change) over time, e.g. continuously over time. For example, contextual information can vary (or change) depending on a type, a state and/or a condition of entities and/or the environment. Thus, contextual information for the first entity 10 with one timestamp may be different to contextual information for the first entity 10 with another timestamp.

In some embodiments, the contextual information and the timestamp may be acquired from the network. For example, in some embodiments, the contextual information and timestamp may be acquired from one or more sensors in the network, e.g. one or more smart meters in the network comprising one or more sensors, one or more network nodes (e.g. one or more routers and/or one or more gateways) in the network comprising one or more sensors, one or more location sensors (such as one or more global positioning system (GPS) sensors), and/or any other sensors. In these embodiments, the one or more sensors can be configured to record the contextual information and the timestamp. In other embodiments, the contextual information and the timestamp may be acquired from a memory, e.g. the local memory 14 of the first entity 10. In some of these embodiments, the contextual information acquired from the memory may be from the network, such as from one or more sensors in the network as described earlier.

In some embodiments, the contextual information for the first entity 10 may comprise any one or more of utility (or energy) consumption information for the first entity 10, environmental information for the first entity 10, location information for the first entity 10, neighbourhood information for the first entity 10, and network information for the first entity 10.

In some embodiments, the utility consumption information may comprise information indicative of utility (or energy) consumption for the first entity 10. In some embodiments, the utility (or energy) consumption information for the first entity 10 may comprise electricity, gas and/or water consumption information for the first entity 10. In some embodiments involving electricity consumption information for the first entity 10, the electricity consumption information for the first entity 10 may comprise a current rate for the first entity 10, a voltage rate for the first entity 10, a power for the first entity 10, a power factor for the first entity 10, an active power measurement for the first entity 10, a reactive power measurement for the first entity 10, a frequency for the first entity 10, phase information for the first entity 10, and/or any other electricity consumption information for the first entity 10. In some embodiments, the utility consumption information may be from a smart utility network, such as a smart electricity network (i.e. a smart grid), a smart water supply network, and/or a smart gas distribution network. In some embodiments, the utility consumption information for the first entity 10 can be from one or more utility consumption sensors (i.e. one or more sensors configured to obtain utility consumption information for the first entity 10), such as one or more sensors of one or more smart meters. In some embodiments, the smart utility network may comprise the one or more utility consumption sensors. In general, the smart utility network may be one that is advanced by the integration of communication technologies.

In some embodiments, the environmental information for the first entity 10 may comprise information indicative of a temperature in the environment of the first entity 10 and/or a humidity in the environment of the first entity 10. The environmental information for the first entity 10 can be from one or more environmental sensors (i.e. one or more sensors configured to obtain environmental information for the first entity 10), such as a temperate sensor and/or a humidity sensor. In some embodiments, the location information for the first entity 10 may comprise information indicative of a geographical location of the first entity 10, a relative location of the first entity 10, and/or an indoor location of the first entity 10. The location information for the first entity 10 can be from one or more location sensors (i.e. one or more sensors configured to obtain location information for the first entity 10), such as a GPS sensor.

In some embodiments, the neighbourhood information for the first entity 10 may comprise information indicative of a number of other entities (e.g. machines, devices and/or other entities) sensed around the first entity 10, e.g. within a predefined area around the first entity 10 or within a predefined distance to the first entity 10. The neighbourhood information for the first entity 10 can be from one or more neighbourhood sensors (i.e. one or more sensors configured to obtain neighbourhood information for the first entity 10). In some embodiments, the network information for the first entity 10 may comprise an internet protocol (IP) address for the first entity 10. The network information for the first entity 10 can be from one or more internet services and/or one or more network sensors (i.e. one or more sensors configured to obtain network information for the first entity 10), such as one or more sensors of one or more network nodes. In some embodiments, the network nodes may comprise one or more routers and/or one or more gateways.

The method can use already existing infrastructure for the acquisition of the contextual information for the first entity 10 according to some embodiments. This means that the advantages mentioned earlier can be achieved without requiring additional infrastructure. Moreover, the method can also further benefit from the security mechanisms already implemented in those existing infrastructures.

Returning back to FIG. 2, at block 104, a first authentication token is generated using the acquired contextual information. More specifically, the processing circuitry 12 of the first entity 10 generates the first authentication token using the acquired contextual information. As mentioned earlier, contextual information for the first entity 10 with one timestamp may be different to contextual information for the first entity 10 with another timestamp. In this way, it is possible to use a newly generated authentication token each time the first entity 10 wishes to authenticate itself with another entity, e.g. in each different session. This provides protection against attacks where credentials are compromised and re-used by malicious parties. In particular, the generated authentication token is difficult to estimate since the contextual information used to generate it varies (or changes) over time. The first authentication token can be used as a one-time password.

In some embodiments, the method may comprise generating the first authentication token using the acquired contextual information and any one or more of the timestamp, a random number (e.g. a pseudo random number) generated for the first entity 10 and having the timestamp, identification information for the first entity 10, and identification information for the second entity. In some embodiments, the first authentication token may be generated using the tuple (representing the contextual information and the timestamp for the contextual information), and any one or more of the timestamp for the contextual information, the random number generated for the first entity 10 and having the timestamp, the identification information for the first entity 10 and the identification information for the second entity. In some embodiments, the identification information for the first entity 10 may comprise a serial number for the first entity 10 and/or a media access control (MAC) address for the first entity 10. Similarly, in some embodiments, the identification information for the second entity may comprise a serial number for the second entity and/or a media access control (MAC) address for the second entity.

In some embodiments involving a random number, the random number may be acquired from a (e.g. pseudo) random number generator that generated the random number for the first entity 10. In some embodiments, one or more of the sensors (e.g. one or more sensor of one or more smart meters) may comprise this random number generator. In some embodiments, the first authentication token may be generated using the acquired contextual information and optionally also any one or more of the timestamp for the contextual information, the identification information for the first entity 10, and the identification information for the second entity, and the random number generated for the first entity 10 may be inserted into the generated first authentication token. This use of a random number generated for the first entity 10 can increase the strength of the unpredictability of the first authentication token.

In some embodiments, the contextual information that is acquired for the first entity 10 and used to generate the authentication token may be adjusted based on an application and/or a security threat scenario. For example, in some cases (e.g. when a risk of a security threat is high), a larger amount of contextual information for the first entity 10 may be acquired and used to generate the authentication token. This can improve security even further. In other cases (e.g. when a risk of a security threat is low), a smaller amount of contextual information for the first entity 10 may be acquired and used to generate the authentication token. This can conserve bandwidth in the network. In some embodiments, the token may be for use in granting (e.g. a time-limited) access to a specific resource.

At block 106 of FIG. 2, transmission of an (e.g. integrity protected) authentication request message is initiated towards a second entity of the network requesting authentication of the first entity 10 with the second entity. More specifically, the processing circuitry 12 of the first entity 10 initiates transmission of the authentication request message. The authentication request message comprises the first authentication token and the timestamp used to generate the authentication token for use in the authentication. In some embodiments, the authentication request message may further comprise the identification information for the first entity 10 and the identification information for the second entity.

In some embodiments, transmission of the authentication request message towards the second entity may be initiated via a first communication channel between the first entity 10 and the second entity. In some embodiments, the first communication channel can be a primary communication channel. For example, in some embodiments, the first communication channel can be an in-band communication channel. An in-band communication channel can be defined as a communication channel that is used for primary communications between entities (e.g. devices or machines). The first communication channel may operate using a frequency within a predefined frequency band. In some embodiments, the first authentication token may have a hash function or a hash based authentication code (HMAC) applied to it. In this way, it is possible to enable verification of the integrity of the authentication request message.

At block 108 of FIG. 2, an (e.g. integrity protected) authentication response message indicative of whether authentication of the first entity 10 with the second entity is successful or unsuccessful is received. More specifically, the processing circuitry 12 of the first entity 10 receives the authentication response message. In some embodiments, the authentication response message may be received through the first (e.g. in-band) communication channel described earlier. In some embodiments, the authentication response message may comprise a verification token for verifying message. In some embodiments, the authentication response message may further comprise the identification information for the first entity 10 and the identification information for the second entity 20.

Although not illustrated in FIG. 2, in some embodiments, the method may comprise initiating transmission of the acquired contextual information for the first entity 10 and the timestamp for the contextual information towards the third entity of the network. More specifically, the processing circuitry 12 of the first entity 10 initiates transmission of the acquired contextual information for the first entity 10 and the timestamp for the contextual information towards the third entity of the network according to some embodiments. The transmission of the acquired contextual information for the first entity 10 and the timestamp for the contextual information may be initiated periodically or on-demand. In some embodiments, the acquired contextual information for the first entity 10 and the timestamp for the contextual information may be transmitted as a code, e.g. via a short message service (SMS) or a mobile application.

In some embodiments, the transmission of the contextual information for the first entity 10 and the timestamp for the contextual information may be initiated via a second communication channel. In some embodiments, the second communication channel may be an extra or secondary communication channel. For example, the second communication channel can be secondary to the first communication channel mentioned earlier. The second communication channel is separate from the first communication channel. Using a separate second communication channel for the transmission of the contextual information for the first entity 10 and the timestamp for the contextual information makes it significantly more difficult for an attacker to intercept and subvert the authentication process, because it requires such an attacker to compromise two communications channels.

In some embodiments, the second communication channel may be an out-of-band (OOB) communication channel. In these embodiments, the authentication of the first entity 10 with the second entity 20 may be referred to as out-of-band authentication (OOBA). Examples of an OOBA can include the transmission via an SMS or a mobile application as mentioned earlier. An out-of-band communication channel can be defined as a communication channel that is separate from a primary communication channel. More specifically, an out-of-band communication channel can be defined as a communication channel that use a frequency that is outside the frequency band used by a primary communication channel. The primary communication channel can, for example, be the first communication channel between the first entity 10 and the second entity 20. In some embodiments, the second communication channel may be a smart grid communication channel. Thus, advantageously, additional infrastructure is not required to transmit the acquired contextual information for the first entity 10 and the timestamp for the contextual information.

Figure 3:
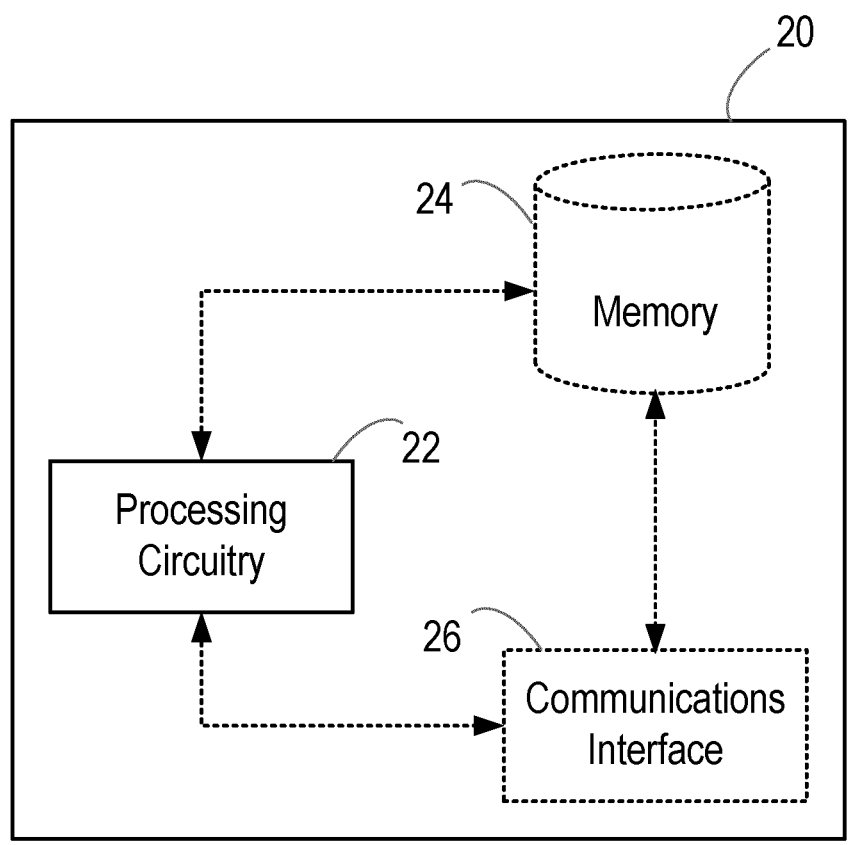
FIG. 3 is a block diagram illustrating a second entity according to an embodiment.

FIG. 3 illustrates a second entity 20 of a network in accordance with an embodiment. The second entity 20 is for authenticating a first entity 10 with the second entity 20. In some embodiments, the second entity 20 may be a server of the network.

As illustrated in FIG. 3, the second entity 20 comprises processing circuitry (or logic) 22. The processing circuitry 22 controls the operation of the second entity 20 and can implement the method described herein. The processing circuitry 22 can comprise one or more processors, processing units, multi-core processors or modules that are configured or programmed to control the second entity 20 in the manner described herein. In particular implementations, the processing circuitry 22 of the second entity 20 can comprise a plurality of software and/or hardware modules that are each configured to perform, or are for performing, individual or multiple steps of the method described herein.

Briefly, the processing circuitry 22 of the second entity 20 is configured to, in response to receiving an authentication request message from a first entity 10 of the network requesting authentication of the first entity 10 with the second entity 20 (wherein the authentication request message comprises a first authentication token and a timestamp for contextual information for the first entity used to generate the first authentication token), initiate transmission of a verification request message towards a third entity requesting verification of the authentication request message. The verification request message comprises the first authentication token and the timestamp for use in the verification. The processing circuitry 22 of the second entity 20 is configured to receive a verification response message from the third entity indicative of whether verification of the authentication request message is successful and initiate transmission of an authentication response message towards the first entity 10. The authentication response message indicates that authentication of the first entity 10 with the second entity 20 is successful if verification of the authentication request message is successful or indicating that authentication of the first entity 10 with the second entity 20 is unsuccessful if verification of the authentication request message is unsuccessful.

As illustrated in FIG. 3, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any messages, requests, responses, indications, information, data, notifications, signals, or similar, that are described herein. The processing circuitry 22 of the second entity 20 may be configured to control the memory 24 of the second entity 20 to store any messages, requests, responses, indications, information, data, notifications, signals, or similar, that are described herein.

In some embodiments, as illustrated in FIG. 3, the second entity 20 may optionally comprise a communications interface 26. The communications interface 26 of the second entity 20 can be connected to the processing circuitry 22 of the second entity 20 and/or the memory 24 of second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with the first entity 10, the third entity, and/or any other entity of the network. The communications interface 26 of the second entity 20 can be configured to transmit and/or receive any messages, requests, responses, indications, information, data, notifications, signals, or similar, that are described herein. In some embodiments, the processing circuitry 22 of the second entity 20 may be configured to control the communications interface 26 of the second entity 20 to transmit and/or receive any messages, requests, responses, indications, information, data, notifications, signals, or similar, that are described herein.

Although the second entity 20 is illustrated in FIG. 3 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 3 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 3 only shows the components required to illustrate an embodiment of the second entity 20 and, in practical implementations, the second entity 20 may comprise additional or alternative components to those shown.

Figure 4:
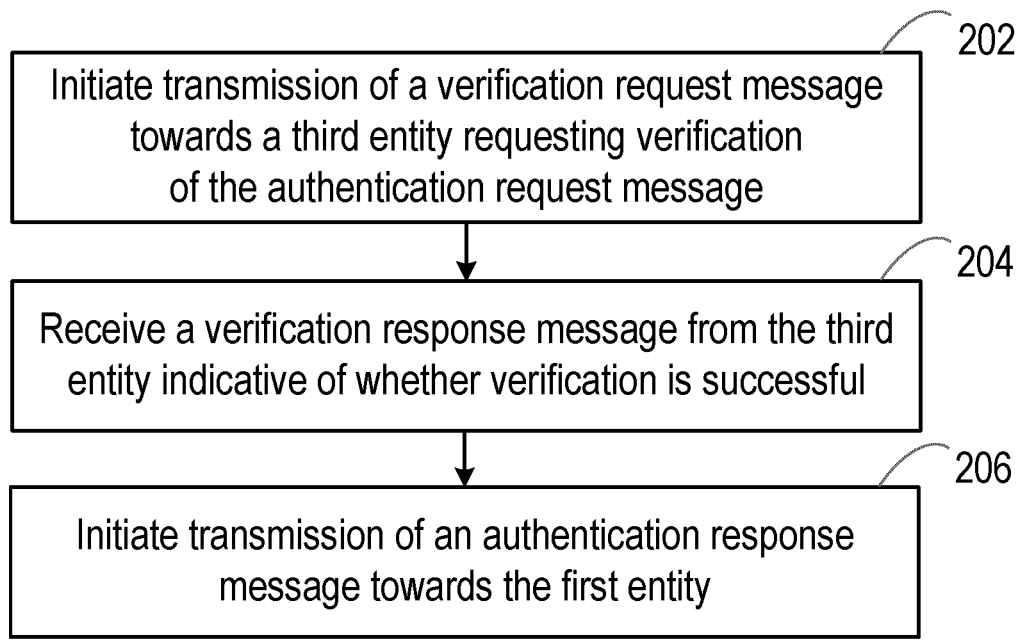
FIG. 4 is a block diagram illustrating a method performed by a second entity according to an embodiment.

FIG. 4 is a flowchart illustrating a method performed by a second entity 20 in accordance with an embodiment. The method is for authenticating the first entity 10 with the second entity 20. The second entity 20 described earlier with reference to FIG. 3 is configured to operate in accordance with the method of FIG. 4. The method can be performed by or under the control of the processing circuitry 22 of the second entity 20.

As the contextual information for the first entity 10 is dynamic and can vary (or change) over time, the contextual information for the first entity 10 used to generate the first authentication token needs to be verified. Thus, as illustrated at block 202 of FIG. 4, in response to receiving an authentication request message from a first entity 10 of the network requesting authentication of the first entity 10 with the second entity 20 (wherein the authentication request message comprises a first authentication token and a timestamp for contextual information, e.g. one or more contextual parameters, for the first entity 10 used to generate the first authentication token), transmission of a verification request message is initiated towards a third entity. The verification request message requests verification of the authentication request message. For example, the verification request message can request whether the acquired contextual information for the first entity 10 matches contextual information for the first entity 10 stored in a database.

In some embodiments, the verification request message can comprise the same or similar contents as the authentication request message. For example, the verification request message may comprise the same contents as the authentication request message but in a different predetermined order. As mentioned earlier, the authentication request message comprises the first authentication token and the timestamp used to generate the authentication token for use in the authentication. Thus, the verification request message comprises the first authentication token and the timestamp for use in the verification. As also mentioned earlier, in some embodiments, the authentication request message may further comprise the identification information for the first entity 10 and the identification information for the second entity 20. Thus, in some embodiments, the verification request message may further comprise the identification information for the first entity 10 and the identification information for the second entity 20. In some embodiments, transmission of the verification request message towards the third entity may be initiated via the second (e.g. out-of-band) communication channel described earlier.

Returning back to FIG. 4, at block 204, a verification response message is received from the third entity. The verification response message is indicative of whether verification of the authentication request message is successful. For example, the verification response message may comprise an indication that the verification of the authentication message is successful or unsuccessful. The verification response message may be received through the second (e.g. out-of-band) communication channel described earlier. As mentioned earlier, in some embodiments, the second communication channel may be a smart grid communication channel. Thus, a smart grid infrastructure can be used in verifying acquired contextual information according to some embodiments.

In some embodiments, the verification response message may also comprise a first verification token and a timestamp for contextual information used to generate the first verification token. In some embodiments, the verification response message may further comprise the identification information for the first entity 10, the identification information for the second entity 20. The second entity 20 either authenticates the first entity 10 or rejects the first authorisation request based on the verification response message. Thus, the second entity 20 receives the verification response message and either authenticates the first entity 10 or rejects the first authorisation request accordingly.

At block 206 of FIG. 4, transmission of an authentication response message is initiated towards the first entity 10. The authentication response message indicates that authentication of the first entity 10 with the second entity 20 is successful if verification of the authentication request message is successful or indicates that authentication of the first entity 10 with the second entity 20 is unsuccessful if verification of the authentication request message is unsuccessful. For example, the authentication response message may comprise an indication that the authentication of the first entity 10 with the second entity 20 is successful (e.g. True) or unsuccessful (e.g. False). Thus, the first entity 10 is only authenticated with the second entity 20 if it can provide the correct contextual information for itself.

In some embodiments, the authentication response message can also comprise the first verification token. In some embodiments, the authentication response message may further comprise any one or more of the identification information for the first entity 10 and the identification information for the second entity 20. In some embodiments, the transmission of the authentication response message may be initiated through the first (e.g. in-band) communication channel described earlier.

Figure 5:
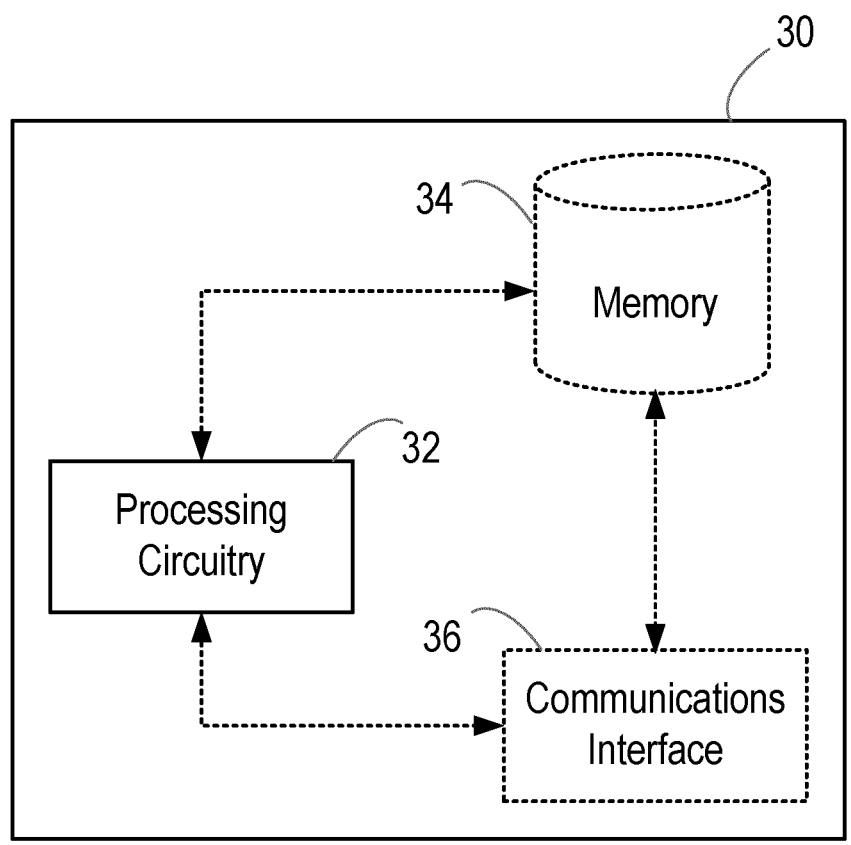
FIG. 5 is a block diagram illustrating a third entity according to an embodiment.

FIG. 5 illustrates a third entity 30 of a network in accordance with an embodiment. The third entity 30 is for authenticating a first entity 10 with a second entity 20. The third entity 30 can be an entity of a trusted party or body, e.g. a trusted third party or body. In some embodiments, the third entity 30 may be a central entity of the network, such as a distribution system operator (DSO) node, e.g. of a smart grid infrastructure of any other infrastructure.

As illustrated in FIG. 5, the third entity 30 comprises processing circuitry (or logic) 32. The processing circuitry 32 controls the operation of the third entity 30 and can implement the method described herein. The processing circuitry 32 can comprise one or more processors, processing units, multi-core processors or modules that are configured or programmed to control the third entity 30 in the manner described herein. In particular implementations, the processing circuitry 32 of the third entity 30 can comprise a plurality of software and/or hardware modules that are each configured to perform, or are for performing, individual or multiple steps of the method described herein.

Briefly, the processing circuitry 32 of the third entity 30 is configured to, in response to receiving a verification request message from a second entity 20 of a network requesting verification of an authentication request message (wherein the verification request message comprises a first authentication token for a first entity 10 and a timestamp for contextual information for the first entity used to generate the first authentication token), generate a second authentication token using contextual information stored in a database for the first entity 10 of the network with the timestamp. The processing circuitry 32 of the third entity 30 is configured to check whether the second authentication token is the same as the first authentication token or different to the first authentication token and initiate transmission of a verification response message towards the second entity 20. The verification response message indicates that verification of the authentication request message is successful if the second authentication token is the same as the first authentication token or indicates that verification of the authentication request message is unsuccessful if the second authentication token is different to the first authentication token.

As illustrated in FIG. 5, in some embodiments, the third entity 30 may optionally comprise a memory 34. The memory 34 of the third entity 30 can comprise a volatile memory or a non-volatile memory. In some embodiments, the memory 34 of the third entity 30 may comprise a non-transitory media. Examples of the memory 34 of the third entity 30 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 32 of the third entity 30 can be connected to the memory 34 of the third entity 30. In some embodiments, the memory 34 of the third entity 30 may be for storing program code or instructions which, when executed by the processing circuitry 32 of the third entity 30, cause the third entity 30 to operate in the manner described herein in respect of the third entity 30. For example, in some embodiments, the memory 34 of the third entity 30 may be configured to store program code or instructions that can be executed by the processing circuitry 32 of the third entity 30 to cause the third entity 30 to operate in accordance with the method described herein in respect of the third entity 30. Alternatively or in addition, the memory 34 of the third entity 30 can be configured to store any messages, requests, responses, indications, information, data, notifications, signals, or similar, that are described herein. The processing circuitry 32 of the third entity 30 may be configured to control the memory 34 of the third entity 30 to store any messages, requests, responses, indications, information, data, notifications, signals, or similar, that are described herein.

In some embodiments, as illustrated in FIG. 5, the third entity 30 may optionally comprise a communications interface 36. The communications interface 36 of the third entity 30 can be connected to the processing circuitry 32 of the third entity 30 and/or the memory 34 of third entity 30. The communications interface 36 of the third entity 30 may be operable to allow the processing circuitry 32 of the third entity 30 to communicate with the memory 34 of the third entity 30 and/or vice versa. Similarly, the communications interface 36 of the third entity 30 may be operable to allow the processing circuitry 32 of the third entity 30 to communicate with the first entity 10, the second entity 20, and/or any other entity of the network. The communications interface 36 of the third entity 30 can be configured to transmit and/or receive any messages, requests, responses, indications, information, data, notifications, signals, or similar, that are described herein. In some embodiments, the processing circuitry 32 of the third entity 30 may be configured to control the communications interface 36 of the third entity 30 to transmit and/or receive any messages, requests, responses, indications, information, data, notifications, signals, or similar, that are described herein.

Although the third entity 30 is illustrated in FIG. 5 as comprising a single memory 34, it will be appreciated that the third entity 30 may comprise at least one memory (i.e. a single memory or a plurality of memories) 34 that operate in the manner described herein. Similarly, although the third entity 30 is illustrated in FIG. 5 as comprising a single communications interface 36, it will be appreciated that the third entity 30 may comprise at least one communications interface (i.e. a single communications interface or a plurality of communications interface) 36 that operate in the manner described herein. It will also be appreciated that FIG. 5 only shows the components required to illustrate an embodiment of the third entity 30 and, in practical implementations, the third entity 30 may comprise additional or alternative components to those shown.

Figure 6:
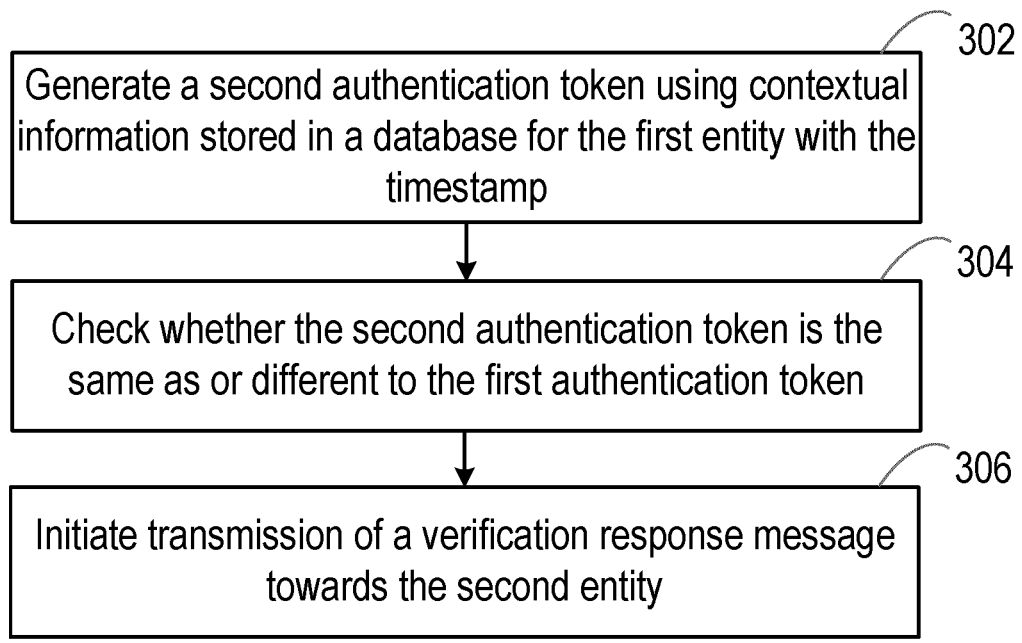
FIG. 6 is a block diagram illustrating a method performed by a third entity according to an embodiment.

FIG. 6 is a flowchart illustrating a method performed by a third entity 30 in accordance with an embodiment. The method is for authenticating a first entity 10 with a second entity 20. The third entity 30 described earlier with reference to FIG. 5 is configured to operate in accordance with the method of FIG. 6. The method can be performed by or under the control of the processing circuitry 32 of the third entity 30.

As illustrated at block 302 of FIG. 6, in response to receiving a verification request message from a second entity 20 of a network requesting verification of an authentication request message (wherein the verification request message comprises a first authentication token for a first entity 10 and a timestamp for contextual information for the first entity, e.g. one or more contextual parameters, used to generate the first authentication token), a second authentication token is generated using contextual information stored in a database for the first entity 10 of the network with the timestamp. More specifically, the processing circuitry 32 of the third entity 30 generates the second authentication token using contextual information stored in a database for the first entity 10 of the network with the timestamp. In some embodiments, the memory 14 of the first entity 10 may comprise the database. In other embodiments, a memory separate to (e.g. remote from or external to) the first entity 10 may comprise the database. In some embodiments, the contextual information stored in a database for the first entity 10 of the network with the timestamp and the timestamp for the contextual information may be represented as a tuple.

In some embodiments, the contextual information stored in the database for the first entity 10 with the timestamp may comprise any one or more of utility consumption information for the first entity 10 such as that described earlier, environmental information for the first entity 10 such as that described earlier, location information for the first entity 10 such as that described earlier, neighbourhood information for the first entity 10 such as that described earlier, and network information for the first entity 10 such as that described earlier.

In some embodiments, the method may comprise generating the second authentication token using the contextual information stored in the database for the first entity 10 with the timestamp and any one or more of the timestamp for the contextual information (e.g. from the verification request message), a random number (e.g. a pseudo random number) stored in the database for the first entity 10 with the timestamp, identification information for the first entity 10 as described earlier (e.g. from the verification request message), and identification information for the second entity 20 as described earlier (e.g. from the verification request message). In some embodiments, the second authentication token may be generated using the tuple (representing the contextual information stored in the database for the first entity 10 with the timestamp and the timestamp for the contextual information) and any one or more of the timestamp for the contextual information, the random number stored in the database for the first entity 10 with the timestamp, the identification information for the first entity 10, and the identification information for the second entity 20. In some embodiments, the second authentication token may have a hash function or HMAC applied to it.

In some embodiments involving a random number, the random number may be acquired from a (e.g. pseudo) random number generator that generated the random number for the first entity 10. In some embodiments, one or more of the sensors (e.g. one or more sensor of one or more smart meters) may comprise this random number generator. In some embodiments, the second authentication token may be generated using the contextual information stored in the database for the first entity 10 with the timestamp for the contextual information and optionally also any one or more of the timestamp, the identification information for the first entity 10, and the identification information for the second entity 20, and the random number stored in the database for the first entity 10 with the timestamp may be inserted into the generated second authentication token. This use of a random number can increase the strength of the unpredictability of the second authentication token.

Returning back to FIG. 6, at block 304, it is checked whether the second authentication token is the same as the first authentication token or different to the first authentication token. More specifically, the processing circuitry 32 of the third entity 30 performs this check. In some embodiments, the processing circuitry 32 of the third entity 30 may also be configured to check if the timestamp for the contextual information is timely, i.e. is recent enough or belongs to the last time interval that can be optimized accordingly to prevent replay attacks.

At block 306 of FIG. 6, transmission of a verification response message is initiated towards the second entity 20. More specifically, the processing circuitry 32 of the third entity 30 initiates transmission of the verification response message. The verification response message indicates that verification of the authentication request message is successful if the second authentication token is the same as the first authentication token or indicates that verification of the authentication request message is unsuccessful if the second authentication token is different to the first authentication token. For example, the verification response message may comprise an indication that the verification of the authentication message is successful or unsuccessful. In some embodiments, transmission of the verification response message towards the second entity 20 may be initiated via the second (e.g. out-of-band) communication channel descried earlier.

Although not illustrated in FIG. 6, in some embodiments, a first verification token may be generated using the contextual information stored in the database for the first entity 10 with the timestamp. More specifically, the processing circuitry 32 of the third entity 30 can be configured to generate the first verification token according to some embodiments. In some embodiments, the first verification token may be generated using the contextual information stored in the database for the first entity 10 with the timestamp and any one or more of the time stamp for the contextual information, the identification information for the first entity 10, the identification information for the second entity 20 and an indication that the verification of the authentication message is successful or unsuccessful. In some embodiments, the first verification token may be generated using the tuple (representing the contextual information stored in the database for the first entity 10 with the timestamp and the timestamp for the contextual information), and any one or more of the time stamp for the contextual information (from the verification request message), the identification information for the first entity 10 (from the verification request message), the identification information (from the verification request message) and the indication that the verification of the authentication message is successful (e.g. True) or unsuccessful (e.g. False).

In some embodiments, the verification response message may also comprise the first verification token and the timestamp for the contextual information used to generate the first verification token. In some embodiments, the verification response message may further comprise any one or more of the identification information for the first entity 10 described earlier and the identification information for the second entity 20 described earlier. In some embodiments, the first verification token may have a hash function or HMAC applied to it. In this way, it is possible to enable verification of the integrity of the verification response message.

Although not illustrated in FIG. 6, in some embodiments, the method may comprise (e.g. prior to block 302) acquiring the contextual information for the first entity 10, the timestamp for the contextual information (and optionally also the random number for the first entity 10 with the timestamp), e.g. from the first entity 10 of the network. More specifically, the processing circuitry 32 of the third entity 30 can be configured to acquire the contextual information for the first entity 10, the timestamp for the contextual information (and optionally also the random number for the first entity 10 with the timestamp) according to some embodiments. The contextual information for the first entity 10, the timestamp for the contextual information (and optionally also the random number for the first entity 10 with the timestamp) may be acquired periodically or on-demand. The contextual information for the first entity 10 may be acquired instantaneously or in real time (or near real time).

In some embodiments, the contextual information for the first entity 10, the timestamp for the contextual information (and optionally also the random number with for the first entity 10 the timestamp) may be acquired via a second communication channel. In some embodiments, the second communication channel via which the contextual information for the first entity 10, the timestamp for the contextual information (and optionally also the random number for the first entity 10 with the timestamp) is acquired may be the second (e.g. out-of-band) communication channel described earlier.

Although also not illustrated in FIG. 6, in some of these embodiments, the method may comprise controlling the database to store the acquired contextual information for the first entity 10 (and optionally also the random number for the first entity 10) with the timestamp. More specifically, the processing circuitry 32 of the third entity 30 can be configured to control the database to store the acquired contextual information for the first entity 10 (and optionally also the random number for the first entity 10) with the timestamp. Thus, in some embodiments, the processing circuitry 32 of the third entity 30 can be configured to collect and store contextual information for the first entity 10 (and optionally also random numbers for the first entity 10) over time, with corresponding timestamps for the contextual information (and random numbers). In this way, the processing circuitry 32 of the third entity 30 can then check the stored contextual information (and optionally also the random numbers for the first entity 10) and corresponding timestamps for the verification process described earlier. In some embodiments, the processing circuitry 32 of the third entity 30 can be configured to (e.g. continuously) monitor contextual information for the first entity 10 (and optionally also random numbers for the first entity 10) and store the contextual information (and optionally also the random numbers for the first entity 10) with a timestamp for the contextual information (and random numbers) at regular intervals, such as a time interval of the order of seconds or a more granular or adaptive time resolution. Thus, the third entity 30 can be configured to maintain (recent) contextual information (and optionally also random numbers) in the database.

In some embodiments, the processing circuitry 32 of the third entity 30 can be configured to delete contextual information (and optionally also any random numbers) from the database that has been stored for more than a predefined amount of time. That is, the database does not need to maintain all contextual information (or all random numbers) including that with earlier dates. It is enough for the database to maintain only recent contextual information (and optionally also recent random numbers). In this way, space and memory requirements can be reduced, and the processing circuitry 32 of the third entity 30 can access contextual information (and optionally also a random number) from database faster when performing the check of whether the second authentication token is the same as the first authentication token or different to the first authentication token.

In some embodiments, in addition to storing contextual information (and optionally also random numbers) and corresponding timestamps for the first entity 10, the database may also store contextual information (and optionally also random numbers) and corresponding timestamps for other entities (e.g. for the second entity 20 and/or one or more other entities). The contextual information (and optionally also random numbers) and corresponding timestamps for an entity may be stored in the database with an identity (ID) of the entity. An example of the structure of such a database is shown in the following table, which may also be referred to as "Table 1".

each of parameter changes over time, e.g. depending on factors such as the type of entity, the state of the entity, the number of entities connected to a sensor (e.g. of a smart meter) and/or any other factors.

FIG. 7 is an example of contextual information according to an embodiment. As illustrated in FIG. 7, in some embodiments, the contextual information may comprise utility consumption information (or data) for the first entity 10. In this example, the utility consumption information for the first entity 10 is electricity consumption information for the first entity 10, which may comprise a power for the first entity 10 (e.g. measured in mW), an active power for the first entity 10 (e.g. measured in mW), a reactive power for the first entity 10 (e.g. measured in mVA), a power factor for the first entity 10, a current for the first entity 10 (e.g. measured in mA), a frequency for the first entity 10 (e.g. measured in Hz), a phase for the first entity 10, and/or any other electricity (and/or gas and/or water) consumption information for the first entity 10. As also illustrated in FIG. 7, in some embodiments, the contextual information for the first entity 10 may alternatively or additionally comprise environmental information for the first entity 10, network information for the first entity 10, location information for the first entity 10, a random number and/or any other contextual information for the first entity 10. As illustrated in FIG. 7, the contextual information (and random number) is timestamped.

There is also provided a network comprising one or more first entities 10 as described earlier with reference to FIGS. 1 and 2, one or more second entities 20 as described earlier

| Entity ID | Timestamp | Power (mW) | Power Factor | Current (mA) | Random Number | Other Contextual information | Other Contextual information | Other Contextual information |
|---|---|---|---|---|---|---|---|---|
| ID 1 | 2019.06.10 10:05:16 | 663 | 1.0 | 3 | . . . | . . . | . . . | . . . |
|  | 2019.06.10 10:05:15 | 2640 | 0.986 | 12 | . . . | . . . | . . . | . . . |
|  | . . . | . . . | . . . | . . . | . . . | . . . | . . . | . . . |
| ID 2 | 2019.06.10 10:05:16 | 136968 | 0.829 | 312 |  |  |  |  |
|  | 2019.06.10 10:05:15 | 137720 | 0.830 | 313 |  |  |  |  |
|  | . . . | . . . | . . . | . . . | . . . | . . . | . . . | . . . |
| . . . | . . . | . . . | . . . | . . . | . . . | . . . | . . . | . . . |
|  | . . . | . . . | . . . | . . . | . . . | . . . | . . . | . . . |
| ID n | yyyy.mm.dd hh:mm:ss | . . . | . . . | . . . | . . . | . . . | . . . | . . . |
|  | yyyy.mm.dd hh:mm:ss | . . . | . . . | . . . | . . . | . . . | . . . | . . . |
|  | . . . | . . . | . . . | . . . | . . . | . . . | . . . | . . . |

The example of the database shown in Table 1 includes electricity consumption information (and a random number) together with the corresponding timestamps for that electricity consumption information (and random number) for a plurality of entities. As shown in Table 1, there may be a plurality of parameters related to electricity consumption information, such as an instantaneous power consumption, a current drain, a power factor and/or any other parameter(s) related to electricity consumption information.

Although electricity consumption information has been used to illustrate an example structure for the database referred to herein, it will be understood that the database may alternatively or additionally comprise any other types of contextual information, such as any of the contextual information described earlier. The contextual information stored in the database described herein is temporal in that with reference to FIGS. 3 and 4, and/or one or more third entities 30 as described earlier with reference to FIGS. 5 and 6.

Figure 8:
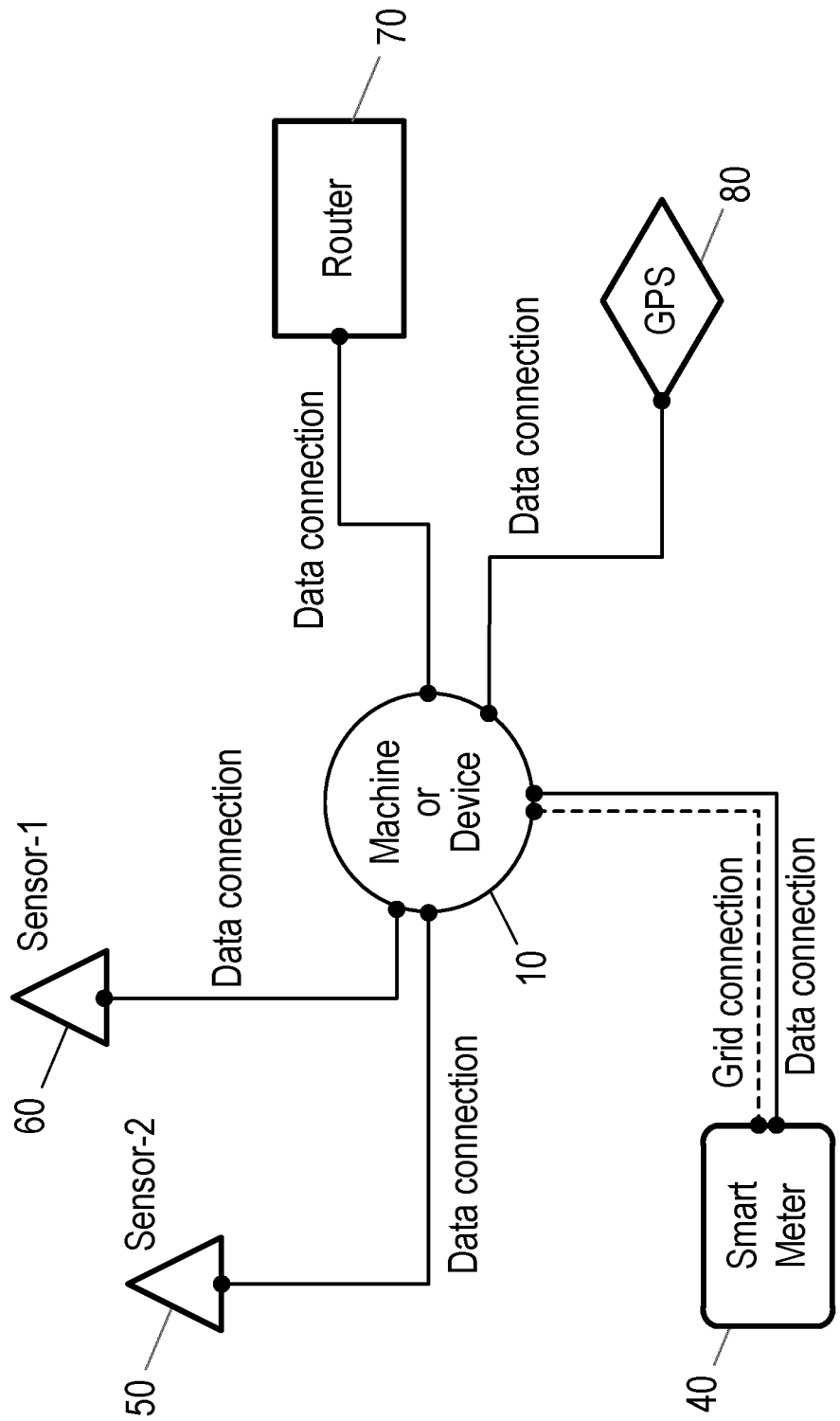
FIG. 8 is a block diagram illustrating a network according to an embodiment.

FIG. 8 is a block diagram illustrating such a network according to an embodiment. As illustrated in FIG. 8, the network comprises the first entity 10 as described earlier with reference to FIG. 1. The first entity 10 can, for example, be a machine or device. The embodiment illustrated in FIG. 8 shows a manner in which contextual information may be acquired by the first entity 10.

For example, as illustrated in FIG. 8, the network may also comprise a plurality of sensors 40, 50, 60, 70, 80. In the embodiment illustrated in FIG. 8, the plurality of sensors comprises a sensor of a smart meter 40 (from which utility consumption information for the first entity 10 can be acquired), a sensor of a router 70 (from which network information for the first entity 10 can be acquired), a GPS sensor 80 (from which location information for the first entity 10 can be acquired), and two other sensors 50, 60 (e.g. from which neighbourhood information for the first entity 10 and/or any other contextual information for the first entity 10 can be acquired).

As illustrated in FIG. 8, each of the plurality of sensors can communicate with the first entity 10, e.g. via a data connection and/or a grid connection (which may be via an electricity cable in some embodiments). Although examples have been provided for the one or more sensors from which the contextual information may be acquired, it will be understood that there may be any other number of sensors, any other type(s) of sensor, and/or any combination of sensors. The first entity 10 of the network illustrated in FIG. 8 operates in the manner described earlier with reference to FIG. 2.

Figure 9:
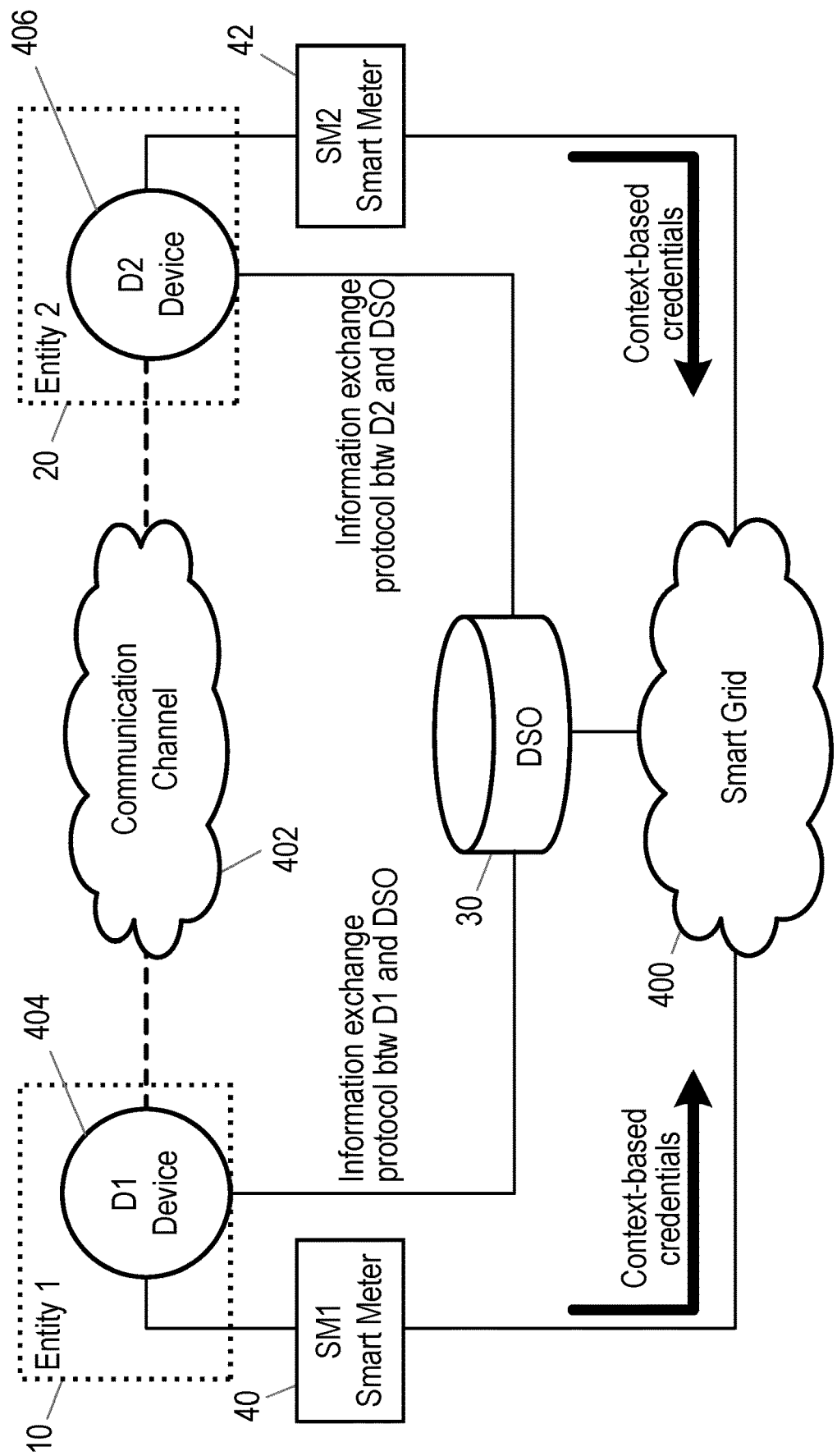
FIG. 9 is a block diagram illustrating a network according to an embodiment.

FIG. 9 is a block diagram illustrating another such a network according to an embodiment. As illustrated in FIG. 9, the network comprises the first entity 10 as described earlier with reference to FIG. 1, the second entity 20 as described earlier with reference to FIG. 3, the third entity 30 as described earlier with reference to FIG. 5. As mentioned earlier, in some embodiments, the third entity 30 may be a central entity of the network such as a DSO node.

In the embodiment illustrated in FIG. 9, the first entity 10 comprises a first device or machine (D1) 404 and the second entity 20 comprises a second device or machine (D2) 406. The first entity 10 (or, more specifically, the first device or machine 404 of the first entity 10) and the second entity 20 (or, more specifically, the second device or machine 406 of the second entity 20) can communicate via the first communication channel 402, which may be a primary communication channel. The dashed lines in FIG. 9 represent communication via the first communication channel 402.

As illustrated in FIG. 9, there can be an information exchange protocol between the first entity 10 (or, more specifically, the first device or machine 404 of the first entity 10) and the third entity 30. Similarly, as illustrated in FIG. 9, there can be an information exchange protocol between the second entity 20 (or, more specifically, the second device or machine 406 of the second entity 20) and the third entity 30. It may be assumed that there is a secure communication and data exchange protocol between the first entity 10 and the third entity 30, and/or between the second entity 20 and the third entity 30. For example, the first entity 10 and/or the second entity 20 can be registered entities and there may be a secure communication and data exchange protocol between registered entities and the third entity 30. The verification of the contextual information, which is included in authentication request messages transmitted in the primary communication channel between the first entity 10 and the second entity 20, can be performed with the data exchange protocol between the third entity and the other entities 10, 20.

As illustrated in FIG. 9, in some embodiments, the network may also comprise a first smart meter (SM1) 40 comprising one or more sensors and a second smart meter (SM2) 42 comprising one or more sensors according to some embodiments. The third entity 30 can communicate with the first smart meter 40 and the second smart meter 42 via the second communication channel 400, e.g. a smart grid communication channel, which can be an out-of-band communication channel. Thus, in some embodiments, a smart grid infrastructure may be integrated with communication technologies. This can enable monitoring and/or measuring of electricity consumption information remotely, e.g. in real-time. The smart meter 40 can report electricity consumption information to the third entity 30. The communication infrastructure integrated with the smart grid infrastructure can be used as the second (e.g. an out-of-band) communication channel to transmit the electricity consumption information.

Generally, in a smart grid infrastructure, electricity consumption information of entities is monitored and recorded regularly by the third entity 30. Alternatively or in addition, other contextual information may also be sent to the third entity 30. In the embodiment illustrated in FIG. 9, the first smart meter 40 is deployed between the first entity 10 and the third entity 30, and the second smart meter 42 is deployed between the second entity 20 and the third entity 30. The first smart meter 40 and the second smart meter 42 can be configured to measure contextual information (e.g. electricity consumption information or any other contextual information) for the first entity 10 and the second entity 20 respectively, and transmit the measured contextual information to the third entity 30. In this way, the third entity 30 can build the database of contextual information with corresponding timestamps (or temporal information).

Although a smart grid infrastructure and electricity consumption information have been provided as an example, it will be understood that the same concepts can also be applied to any other infrastructure and any other contextual information.

As illustrated in FIG. 9, the third entity 30 can acquire contextual information from the first smart meter 40 and/or the second smart meter 42, e.g. via the second communication channel 400. The solid lines in FIG. 9 represent communication via the second communication channel 400. The first communication channel 402 and the second communication channel 400 are separate from each other in the embodiment illustrated in FIG. 9. They can belong to any wired or wireless communication technologies. The first entity 10 (or, more specifically, the first device or machine 404 of the first entity 10) of the network illustrated in FIG. 9 operates in the manner described earlier with reference to FIG. 2, the second entity 20 (or, more specifically, the second device or machine 406 of the second entity 20) of the network illustrated in FIG. 9 operates in the manner described earlier with reference to FIG. 4, and the third entity 30 of the network illustrated in FIG. 9 operates in the operates in the manner described earlier with reference to FIG. 6.

Figure 10:
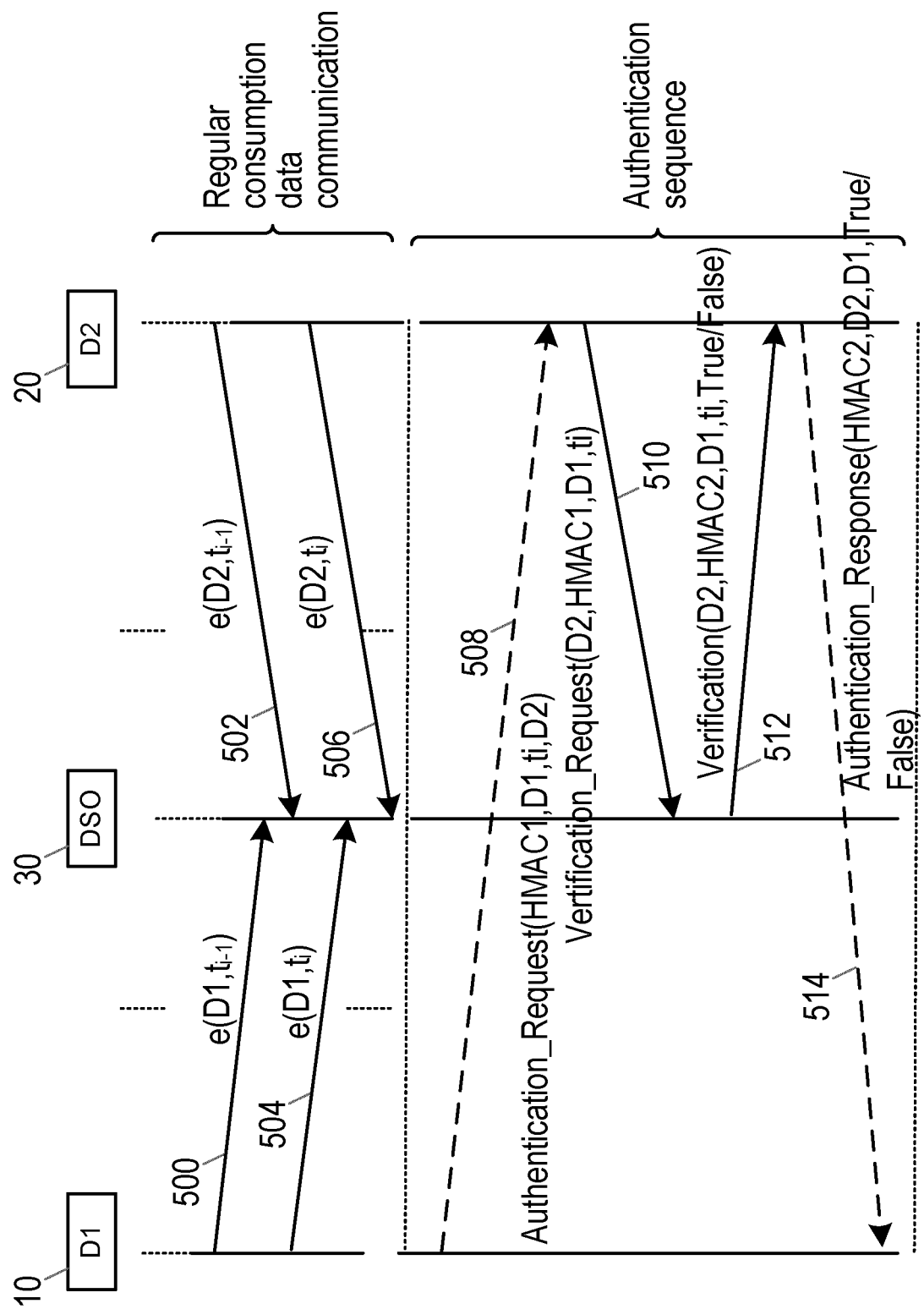
FIG. 10 is a signalling diagram illustrating an exchange of signals in a network according to an embodiment.

FIG. 10 is a signalling (or call flow) diagram illustrating an exchange of signals in an example embodiment. The exchange of signals is in a network, such as the network illustrated in FIG. 9. The network illustrated in FIG. 10 comprises a first entity 10 as described earlier with reference to FIG. 1, a second entity 20 as described earlier with reference to FIG. 3, and a third entity (such as a DSO node) 30 as described earlier with reference to FIG. 5. According to some embodiments, the first entity 10 can comprise a first device or machine and the second entity 20 can comprise a second device or machine. The first entity 10 (or, more specifically, the first device or machine of the first entity 10) and the second entity 20 (or, more specifically, the second device or machine of the second entity 20) can communicate via a first communication channel as described earlier.

Although not illustrated in FIG. 10, contextual information for the first entity 10 of the network and a timestamp for the contextual information is acquired by the first entity 10 of the network in the manner described earlier. As illustrated by arrows 500 and 504 of FIG. 10, in some embodiments, the third entity 30 of the network can acquire contextual information for the first entity 10 of the network (such as any of the contextual information described earlier) and a timestamp for the contextual information. For example, the third entity 30 of the network may acquire contextual information for the first entity 10 of the network with a first timestamp $t_{i-1}$ as illustrated by arrow 500 and contextual information for the first entity 10 of the network with a second timestamp t as illustrated by the arrow 504. The first timestamp and the second timestamp can be different. For example, the first timestamp can be earlier than the second timestamp.

In the embodiment illustrated in FIG. 10, contextual information for the first entity 10 of the network and a corresponding timestamp for the contextual information is represented as a tuple. For example, if $e(D_k, t_i)$ is a tuple representing the contextual information with timestamp t for an entity $D_k$ and assuming $e(D_k, t_i)$ contains similar contextual information to that included in a single row of Table 1, the tuple representing this contextual information and timestamp may be formulated as follows:

$$e(D1, t_i) = <t_i, P, PF, C, O1, O2, O3, O4>,$$

where D1 is the first entity 10, t is the timestamp for the contextual information, P is an instantaneous power consumption for the first entity 10, PF is a power factor for the first entity 10, C is a current drain for the first entity 10, O1 is other contextual information 1 for the first entity 10, O2 is other contextual information 2 for the first entity 10, O3 is other contextual information 3 for the first entity 10 and O4 is other contextual information 4 for the first entity 10.

Although also not illustrated in FIG. 10, contextual information for the second entity 20 of the network and a timestamp for the contextual information may be acquired by the second entity 20 of the network in the same manner as for the first entity 10. As illustrated by arrows 502 and 506 of FIG. 10, in some embodiments, the third entity 30 of the network can acquire contextual information for the second entity 20 of the network (such as any of the contextual information described earlier) and a timestamp for the contextual information. For example, the third entity 30 of the network may acquire contextual information for the second entity 20 of the network with a third timestamp $t_{i-1}$ as illustrated by arrow 502 and contextual information for the second entity 20 of the network with a second timestamp t as illustrated by arrow 506. The first timestamp and the second timestamp can be different. For example, the first timestamp can be earlier than the second timestamp. In some embodiments, contextual information for the second entity 20 of the network and a corresponding timestamp for the contextual information may be represented as a tuple in the same manner as described earlier with respect to the first entity 10.

Thus, in the embodiment illustrated in FIG. 10, the first entity 10 and the second entity 20 can send their contextual information to the third entity 30, e.g. either periodically or on-demand. The third entity 30 can thus receive contextual information for the first entity 10 and the second entity 20, e.g. either periodically or on-demand. The third entity 30 of the network stores the acquired contextual information.

In some embodiments, the first entity 10 of the network may wish to authenticate itself with the second entity 20 of the network and the second entity 20 of the network may wish to authenticate itself with the first entity 10 of the network. Thus, the authentication may be mutual. However, for simplicity, in the embodiment illustrated in FIG. 10, it is the first entity 10 of the network that wishes to authenticate itself with the second entity 20 of the network.

The first entity 10 thus begins an authentication procedure. In particular, although not illustrated in FIG. 10, a first authentication token is generated by the first entity 10 of the network using the acquired contextual information in the manner described earlier. In the illustrated embodiment of FIG. 10, the first authentication token is generated by the first entity 10 of the network using the acquired contextual information, the timestamp for the contextual information, identification information D1 for the first entity 10 such as that described earlier and identification information D2 for the second entity 20 such as that described earlier. More specifically, the first authentication token is generated by the first entity 10 of the network using the tuple $e(D1, t_i)$ representing the contextual information and the timestamp for the contextual information, the timestamp $t_i$ for the contextual information, the identification information D1 for the first entity 10 and the identification information D2.

In order to enable verification of the message integrity, the first authentication token may have a hash function or HMAC applied to it. In the embodiment illustrated in FIG. 10, for example, the first authentication token comprises a HMAC applied to the tuple $e(D1, t_i)$ representing the contextual information and the timestamp for the contextual information, the timestamp $t_i$ for the contextual information, the identification information D1 for the first entity 10 and the identification information D2. The first authentication token HMAC1 according to the embodiment illustrated in FIG. 10 can thus be expressed as:

$$HMAC1 = HMAC(e(D1, ti), (D1, ti, D2)).$$

As illustrated by arrow 508 of FIG. 10, transmission of an (e.g. integrity protected) authentication request message is initiated towards the second entity 20 of the network in the manner described earlier. The transmission of the authentication request message may be initiated through the first (e.g. in-band) communication channel described earlier. The dashed arrows in FIG. 10 represent transmissions via the first communication channel. The authentication request message requests authentication of the first entity 10 with the second entity 20. As described earlier, the authentication request message comprises the first authentication token HMAC1 and the timestamp $t_i$ for the contextual information used to generate the authentication token HMAC1. In the embodiment illustrated in FIG. 10, the authentication request message further comprises the identification information D1 for the first entity 10 and the identification information D2 for the second entity 20, e.g. (HMAC1, D1, $t_i$, D2).

As illustrated by arrow 510 of FIG. 10, in response to receiving the authentication request message from the first entity 10 of the network, transmission of a verification request message is initiated by the second entity 20 of the network towards the third entity 30 of the network in the manner described earlier. The transmission of the verification request message may be initiated through the second (e.g. out-of-band) communication channel described earlier. The solid arrows in FIG. 10 represent transmissions via the second communication channel. The verification request message requests verification of the authentication request message.

The verification request message can comprise the same or similar contents as the authentication request message. For example, the verification request message may comprise the same contents as the authentication request message but in a different predetermined order, e.g. (D2, HMAC1, D1, $t_i$). The verification request message can request whether the acquired contextual information for the first entity 10 matches the contextual information for the first entity 10 stored in a database.

Although not illustrated in FIG. 10, a second authentication token is generated by the third entity 30 of the network using the contextual information stored in the database for the first entity 10 with the timestamp in the manner described earlier. In the illustrated embodiment of FIG. 10, the second authentication token is generated by the third entity 30 of the network using the contextual information stored in the database for the first entity 10 with the timestamp, the timestamp $t_i$, the identification information D1 for the first entity 10 and the identification information D2 for the second entity 20. More specifically, the second authentication token is generated by the third entity 30 of the network using a tuple $e(D1,t_i)$ representing the contextual information stored in the database for the first entity 10 with the timestamp and the timestamp for the contextual information, the timestamp $t_i$ for the contextual information (from the verification request message), the identification information D1 for the first entity 10 (from the verification request message) and the identification information D2 (from the verification request message).

In order to enable verification of the message integrity, the second authentication token may have a hash function or HMAC applied to it. In the embodiment illustrated in FIG. 10, for example, the second authentication token comprises a HMAC applied to the tuple $e(D1,t_i)$ representing the contextual information stored in the database for the first entity 10 and the timestamp for the contextual information, the timestamp $t_i$ for the contextual information, the identification information D1 for the first entity 10 and the identification information D2.

Although not illustrated in FIG. 10, it is checked by the third entity 30 whether the second authentication token is the same as the first authentication token or different to the first authentication token. In some embodiments, the third entity 30 may also check if the timestamp $t_i$ is timely, i.e. $t_i$ is recent enough or belongs to the last time interval that can be optimized accordingly to prevent replay attacks.

As illustrated by arrow 512 of FIG. 10, transmission of a verification response message is initiated by the third entity 30 of the network towards the second entity 20 of the network in the manner described earlier. The transmission of the verification response message may be initiated through the second (e.g. out-of-band) communication channel described earlier. The verification response message is received by the second entity 20 of the network from the third entity 30 of the network in the manner described earlier. The verification response message indicates that verification of the authentication request message is successful if the second authentication token is the same as the first authentication token or indicates that verification of the authentication request message is unsuccessful if the second authentication token is different to the first authentication token.

Although not illustrated in FIG. 10, in some embodiments, a first verification token may be generated by the third entity 30 of the network using the contextual information stored in the database for the first entity 10 with the timestamp in the manner described earlier. In the illustrated embodiment of FIG. 10, the first verification token is generated by the third entity 30 of the network using the contextual information stored in the database for the first entity 10 with the timestamp, the timestamp $t_i$, the identification information D1 for the first entity 10, the identification information D2 for the second entity 20 and an indication that the verification of the authentication message is successful or unsuccessful. More specifically, the first verification token is generated by the third entity 30 of the network using the tuple $e(D1,t_i)$ representing the contextual information stored in the database for the first entity 10 with the timestamp and the timestamp for the contextual information, the timestamp $t_i$ for the contextual information (from the verification request message), the identification information D1 for the first entity 10 (from the verification request message), the identification information D2 (from the verification request message) and the indication that the verification of the authentication message is successful (e.g. True) or unsuccessful (e.g. False).

In order to enable verification of the message integrity, the first verification token may have a hash function or HMAC applied to it. In the embodiment illustrated in FIG. 10, for example, the first verification token comprises a HMAC applied to the tuple $e(D1,t_i)$ representing the contextual information stored in the database for the first entity 10 with the timestamp and the timestamp for the contextual information, the timestamp $t_i$ for the contextual information, the identification information D1 for the first entity 10, the identification information D2, and the indication that the verification of the authentication message is True or False. The first verification token HMAC2 according to the embodiment illustrated in FIG. 10 can thus be expressed as:

$$\text{HMAC2}=\text{HMAC}(e(D1,ti),(D2,D1,\text{True/False})),$$

As described earlier, the verification response message may comprise the first verification token HMAC2 and the timestamp $t_i$ for the contextual information used to generate the first verification token HMAC2. In the embodiment illustrated in FIG. 10, the verification response message further comprises the identification information D1 for the first entity 10, the identification information D2 for the second entity 20 and the indication that the verification of the authentication message is successful (e.g. True) or unsuccessful (e.g. False), e.g. (D2, HMAC2, D1, $t_i$, True/False). The second entity 20 receives the verification response message and either authenticates the first entity 10 or rejects the first authorisation request accordingly.

As illustrated by arrow 514 of FIG. 10, transmission of an authentication response message is initiated by the second entity 20 of the network towards the first entity 10 of the network in the manner described earlier. The transmission of the authentication response message may be initiated through the first (e.g. in-band) communication channel described earlier. The authentication response message indicates that authentication of the first entity 10 with the second entity 20 is successful (True) if verification of the authentication request message is successful or indicates that authentication of the first entity 10 with the second entity 20 is unsuccessful (False) if verification of the authentication request message is unsuccessful. As described earlier, the authentication response message can comprise the first verification token HMAC2. In some embodiments, such as that illustrated in FIG. 10, the authentication response message may further comprise the identification information D1 for the first entity 10 and the identification information D2 for the second entity 20.

Although an example protocol-level implementation has been described with reference to FIG. 10, it will be understood that there may be many alternative implementations of the method described herein.

It is noted that, in the network described herein, the second entity 20 that wishes to verify the authentication request message for the first entity 10 does not actually request contextual information for the first entity 10 from the third entity 30. Instead, the second entity 20 just requests verification of the authentication request message (e.g. whether the first authentication token is valid or invalid). Thus, the third entity 30 returns only a response to the request, namely a verification response message, which indicates either that verification of the authentication request message is successful (e.g. the first authentication token is valid) or unsuccessful (e.g. the first authentication token is invalid). Therefore, the second entity 20 is prevented from obtaining contextual information for the first entity 10, which can safeguard the first entity 10 if it turns out that the second entity 20 is a malicious entity.

It is also noted that the authentication request message comprises the first authentication token generated using the contextual information for the first entity 10, rather than the contextual information for the first entity 10 itself. Moreover, in some embodiments, the first authentication token may even have a hash function applied to it. As known in the art, cryptographic hash functions have a one way property and are thus irreversible. Therefore, the second entity 20 receiving the authentication request message is unable to infer the actual contextual information for the first entity 10 from the authentication request message. In some embodiments, the security of message exchange can be improved in the network by relying on security functions (e.g. secure tunnels, end-to-end encryption, etc.) of the underlying communication infrastructure.

In some embodiments, the method described herein can be used as a primary authentication method. In other embodiments, the method described herein can be used as a secondary authentication method. For example, the method described herein can be used multi-factor authentication (MFA), such as two-factor authentication (2FA), according to some embodiments. MFA is an authentication method that requires more than one pieces of evidence (or factors) from independent categories of credentials to verify an identity of an entity, e.g. for a login or other transaction. These independent categories of credentials are typically knowledge (i.e. something the entity and only the entity knows), possession (i.e. something the entity has and only the entity has), and inherence (i.e. something the entity is and only the entity is). 2FA is a type, or subset, of MFA that requires a combination of two different authentication factors.

Thus, the method described herein can be used on its own or in combination with one or more other authentication methods to provide MFA. The latter can be especially advantageous in critical systems that require extra precautions in addition to standard authentication mechanisms. In particular, it can provide an extra layer of security when a standard authentication mechanism is compromised. Currently, most existing authentication schemes developed for M2M and IoT rely on single authentication. It may be beneficial to employ the method described herein alone or in combination with one or more other authentication methods.

Figure 11:
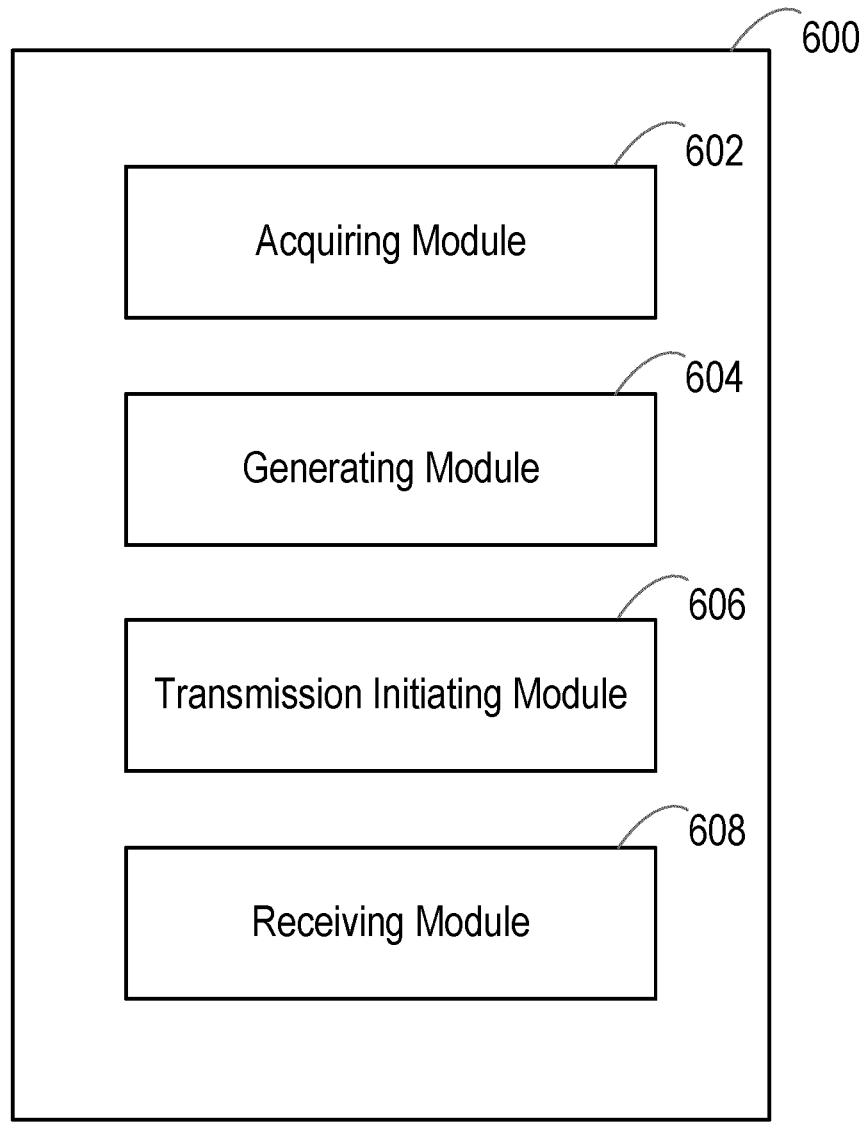
FIG. 11 is a block diagram illustrating a first entity according to an embodiment.

FIG. 11 is a block diagram illustrating a first entity 600 of a network in accordance with an embodiment. The first entity 600 comprises an acquiring module 602 configured to acquire contextual information for the first entity 600 and a timestamp for the contextual information. The first entity 600 comprises a generating module 604 configured to generate an authentication token using the acquired contextual information. The first entity 600 comprises a transmission initiating module 606 configured to initiate transmission of an authentication request message towards a second entity of the network requesting authentication of the first entity 600 with the second entity. The authentication request message comprises the generated authentication token and the timestamp for use in the authentication. The first entity 600 comprises a receiving module 608 configured to receive an authentication response message indicative of whether authentication of the first entity 600 with the second entity is successful or unsuccessful. The first entity 600 may operate in the manner described herein.

Figure 12:
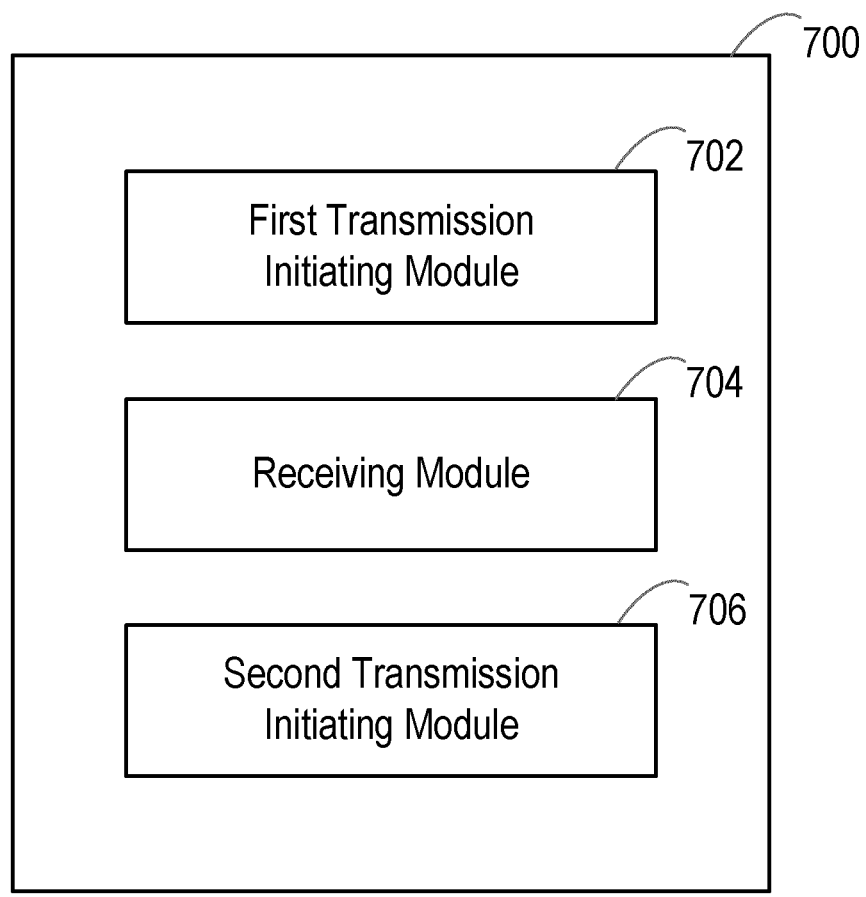
FIG. 12 is a block diagram illustrating a second entity according to an embodiment.

FIG. 12 is a block diagram illustrating a second entity 700 of a network in accordance with an embodiment. The second entity 700 comprises a first transmission initiating module 702 configured to, in response to receiving an authentication request message from a first entity 600 of the network requesting authentication of the first entity 600 with the second entity 700 (wherein the authentication request message comprises an authentication token and a timestamp for contextual information for the first entity 600 used to generate the authentication token), initiate transmission of a verification request message towards a third entity requesting verification of the authentication request message, wherein the verification request message comprises the authentication token and the timestamp for use in the verification. The second entity 700 comprises a receiving module 704 configured to receive a verification response message from the third entity indicative of whether verification of the authentication request message is successful. The second entity 700 comprises a second transmission initiating module 706 configured to initiate transmission of an authentication response message towards the first entity 600 indicating that authentication of the first entity 600 with the second entity 700 is successful if verification of the authentication request message is successful or indicating that authentication of the first entity 600 with the second entity 700 is unsuccessful if verification of the authentication request message is unsuccessful. The second entity 700 may operate in the manner described herein.

Figure 13:
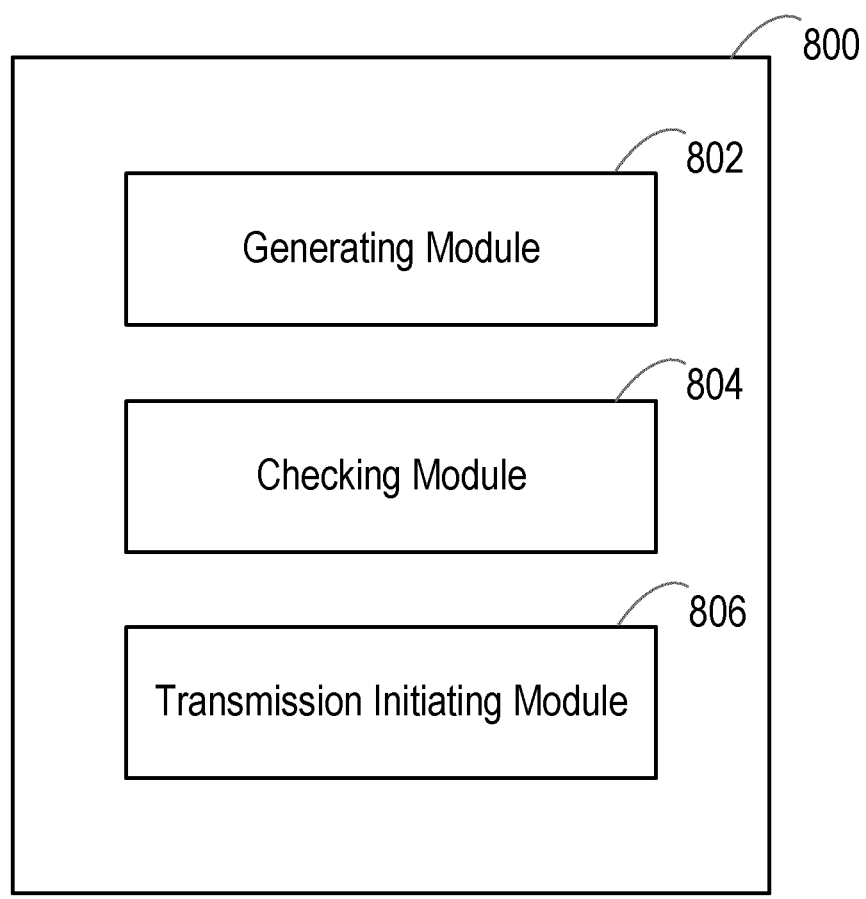
FIG. 13 is a block diagram illustrating a third entity according to an embodiment.

FIG. 13 is a block diagram illustrating a third entity 800 of a network in accordance with an embodiment. The third entity 800 comprises a generating module 802 configured to, in response to receiving a verification request message from a second entity 700 of a network requesting verification of an authentication request message (wherein the verification request message comprises a first authentication token for a first entity 600 and a timestamp for contextual information for the first entity 600 used to generate the first authentication token), generate a second authentication token using contextual information stored in a database for the first entity 600 of the network with the timestamp. The third entity 800 comprises a checking module 804 configured to check whether the second authentication token is the same as the first authentication token or different to the first authentication token. The third entity 800 comprises a transmission initiating module 806 configured to initiate transmission of a verification response message towards the second entity 700 indicating that verification of the authentication request message is successful if the second authentication token is the same as the first authentication token or indicating that verification of the authentication request message is unsuccessful if the second authentication token is different to the first authentication token. The third entity 800 may operate in the manner described herein.

There is also provided a computer program comprising instructions which, when executed by processing circuitry (such as the processing circuitry 12 of the first entity 10 described earlier, the processing circuitry 22 of the second entity 20 described earlier, or the processing circuitry 32 of the third entity 30 described earlier), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described earlier, the processing circuitry 22 of the second entity 20 described earlier, or the processing circuitry 32 of the third entity 30 described earlier) to cause the processing circuitry to perform at least part of the method described herein. There is provided a computer program product comprising a carrier containing instructions for causing processing circuitry (such as the processing circuitry 12 of the first entity 10 described earlier, the processing circuitry 22 of the second entity 20 described earlier, or the processing circuitry 32 of the third entity 30 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

The entity functionality described herein can be performed by hardware. Thus, any one or more entities described herein can be a hardware entity. However, it will also be understood that at least part or all of the entity functionality described herein can be virtualized. For example, the functions performed by any one or more entities described herein can be implemented in software running on generic hardware that is configured to orchestrate the entity functionality. Thus, in some embodiments, any one or more entities described herein can be a virtual entity. In some embodiments, at least part or all of the entity functionality described herein may be performed in a network enabled cloud. The entity functionality described herein may all be at the same location or at least some of the entity functionality may be distributed.

It will be understood that at least some or all of the method steps described herein can be automated in some embodiments. That is, in some embodiments, at least some or all of the method steps described herein can be performed automatically. The method can thus provide improved authentication in an autonomous manner without requiring human intervention.

Thus, in the manner described herein, there is advantageously provided an improved technique for authenticating a first entity with a second entity. The technique enables the generation of a context-based dynamic security token for entities, which can be verified by different entities. The technique can be useful in a variety of applications including, but not limited to, IoT applications, M2M applications, and/or any other applications. The method can help to automatize security procedures in such applications, e.g. by leveraging the flexibility of a token based authentication scheme.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first entity of an internet of things (IoT) network, the method comprising:
   acquiring contextual information for the first entity and a timestamp for the contextual information, wherein the acquiring the contextual information comprises receiving the contextual information from one or more sensors in the IoT network that are associated with the first entity and that measure the contextual information, wherein the contextual information is reported by the first entity or the one or more sensors to a third entity of the IoT network via an out-of-band communication channel;
   generating a first authentication token using the contextual information acquired;
   initiating, via an in-band communication channel between the first entity and a second entity of the IoT network, transmission of an authentication request message towards the second entity of the IoT network requesting authentication of the first entity with the second entity, wherein the authentication request message comprises the first authentication token generated and the timestamp for use in the authentication, with the authentication to be based on whether the first authentication token matches a second authentication token generated using the contextual information reported to the third entity via the out-of-band communication channel; and
   receiving, via the in-band communication channel between the first entity and the second entity, an authentication response message indicative of whether authentication of the first entity with the second entity is successful or unsuccessful.

2. The method of claim 1, wherein the generating the first authentication token comprises generating the first authentication token using the contextual information acquired and any one or more of:
   the timestamp;
   a random number generated for the first entity and having the timestamp;
   identification information for the first entity; and
   identification information for the second entity.

3. The method of claim 1, wherein the contextual information for the first entity comprises any one or more of:
   utility consumption information for the first entity;
   environmental information for the first entity;
   location information for the first entity;
   neighbourhood information for the first entity; and
   network information for the first entity.

4. The method of claim 1, wherein the contextual information characterizes a state and/or condition of the first entity, or of an environment of the first entity, as of a time indicated by the timestamp, wherein the state and/or condition changes over time.

5. The method of claim 1, wherein the contextual information includes:
   information about consumption of electricity, water, and/or gas by the first entity, as measured by the one or more sensors associated with the first entity; and/or
   information about a temperature, humidity, or other environmental metric that characterizes an environment in which the first entity is located.

6. The method of claim 1, wherein the contextual information includes:
   information indicating a geographical location of the first entity, a relative location of the first entity, or an indoor location of the first entity, as measured by the one or more sensors; and/or
   information indicating how many other entities are sensed as being present around the first entity.

7. A first entity of an internet of things (IoT) network, wherein the first entity comprises processing circuitry configured to:

acquire contextual information for the first entity and a timestamp for the contextual information, wherein the processing circuitry is configured to acquire the contextual information by receiving the contextual information from one or more sensors in the IoT network that are associated with the first entity and that measure the contextual information, wherein the contextual information is reported by the first entity or the one or more sensors to a third entity of the IoT network via an out-of-band communication channel;

generate a first authentication token using the contextual information acquired;

initiate, via an in-band communication channel between the first entity and a second entity of the IoT network, transmission of an authentication request message towards the second entity of the IoT network requesting authentication of the first entity with the second entity, wherein the authentication request message comprises the first authentication token generated and the timestamp for use in the authentication, with the authentication to be based on whether the first authentication token matches a second authentication token generated using the contextual information reported to the third entity via the out-of-band communication channel; and receive, via the in-band communication channel between the first entity and the second entity, an authentication response message indicative of whether authentication of the first entity with the second entity is successful or unsuccessful.

8. The first entity of claim 7, wherein the processing circuitry is configured to generate the first authentication token by generating the first authentication token using the contextual information acquired and any one or more of:
the timestamp;
a random number generated for the first entity and having the timestamp;
identification information for the first entity; and
identification information for the second entity.

9. The first entity of claim 7, wherein the contextual information for the first entity comprises any one or more of:
utility consumption information for the first entity;
environmental information for the first entity;
location information for the first entity;
neighbourhood information for the first entity; and
network information for the first entity.

10. The first entity of claim 7, wherein the contextual information characterizes a state and/or condition of the first entity, or of an environment of the first entity, as of a time indicated by the timestamp, wherein the state and/or condition changes over time.

11. The first entity of claim 7, wherein the contextual information includes:
information about consumption of electricity, water, and/or gas by the first entity, as measured by the one or more sensors associated with the first entity; and/or
information about a temperature, humidity, or other environmental metric that characterizes an environment in which the first entity is located.

12. The first entity of claim 7, wherein the contextual information includes:
information indicating a geographical location of the first entity, a relative location of the first entity, or an indoor location of the first entity, as measured by the one or more sensors; and/or
information indicating how many other entities are sensed as being present around the first entity.

13. A method performed by a third entity, the method comprising:
receiving, from a first entity of an internet of things (IoT) network or from one or more sensors in the IoT network that are associated with the first entity, contextual information measured by the one or more sensors for the first entity, wherein the contextual information is received via an out-of-band communication channel;
storing the contextual information in a database for the first entity with a timestamp;
receiving, from a second entity of the IoT network, a verification request message that requests verification of an authentication request message that the second entity received from the first entity via an in-band communication channel, wherein the verification message comprises a first authentication token for the first entity and the timestamp; and
in response to receiving the verification request message:
generating a second authentication token using the contextual information stored in the database for the first entity with the timestamp comprised in the verification request message;
checking whether the second authentication token is the same as the first authentication token or different from the first authentication token;
and
initiating transmission of a verification response message towards the second entity indicating that verification of the authentication request message is successful if the second authentication token is the same as the first authentication token or indicating that verification of the authentication request message is unsuccessful if the second authentication token is different from the first authentication token.

14. The method of claim 13, further comprising generating the second authentication token using the contextual information stored in the database for the first entity with the timestamp comprised in the verification request message and any one or more of:
the timestamp comprised in the verification request message;
a random number stored in the database for the first entity with the timestamp comprised in the verification request message;
identification information for the first entity; and
identification information for the second entity.

15. The method of claim 13, wherein the contextual comprises any one or more of:
utility consumption information for the first entity;
environmental information for the first entity;
location information for the first entity;
neighbourhood information for the first entity; and
network information for the first entity.

16. The method of claim 13, wherein the contextual information characterizes a state and/or condition of the first entity, or of an environment of the first entity, as of a time indicated by the timestamp, wherein the state and/or condition changes over time.

17. The method of claim 13, wherein the contextual information includes:
information about consumption of electricity, water, and/or gas by the first entity, as measured by the one or more sensors associated with the first entity; and/or
information about a temperature, humidity, or other environmental metric that characterizes an environment in which the first entity is located.

18. The method of claim 13, wherein the contextual information includes:
- information indicating a geographical location of the first entity, a relative location of the first entity, or an indoor location of the first entity, as measured by the one or more sensors; and/or
- information indicating how many other entities are sensed as being present around the first entity.

19. A third entity comprising processing circuitry configured to:
- receive, from a first entity of an internet of things (IoT) network or from one or more sensors in the IoT network that are associated with the first entity, contextual information measured by the one or more sensors for the first entity, wherein the processing circuitry is configured to receive the contextual information via an out-of-band communication channel;
- store the contextual information in a database for the first entity with a timestamp;
- receive, from a second entity of the IoT network, a verification request message that requests verification of an authentication request message that the second entity received from the first entity via an in-band communication channel, wherein the verification request message comprises a first authentication token for the first entity and the timestamp; and
- in response to receiving the verification request message:
  - generate a second authentication token using the contextual information stored in the database for the first entity with the timestamp comprised in the verification request message;
  - check whether the second authentication token is the same as the first authentication token or different from the first authentication token; and
  - initiate transmission of a verification response message towards the second entity indicating that verification of the authentication request message is successful if the second authentication token is the same as the first authentication token or indicating that verification of the authentication request message is unsuccessful if the second authentication token is different from the first authentication token.

20. The third entity of claim 19, wherein the processing circuitry is further configured to generate the second authentication token using the contextual information stored in the database for the first entity with the timestamp comprised in the verification request message and any one or more of:
- the timestamp comprised in the verification request message;
- a random number stored in the database for the first entity with the timestamp comprised in the verification request message;
- identification information for the first entity; and
- identification information for the second entity.

21. The third entity of claim 19, wherein the contextual information characterizes a state and/or condition of the first entity, or of an environment of the first entity, as of a time indicated by the timestamp, wherein the state and/or condition changes over time.

22. The third entity of claim 19, wherein the contextual information includes:
- information about consumption of electricity, water, and/or gas by the first entity, as measured by the one or more sensors associated with the first entity; and/or
- information about a temperature, humidity, or other environmental metric that characterizes an environment in which the first entity is located.

23. The third entity of claim 19, wherein the contextual information includes:
- information indicating a geographical location of the first entity, a relative location of the first entity, or an indoor location of the first entity, as measured by the one or more sensors; and/or
- information indicating how many other entities are sensed as being present around the first entity.

* * * * *